United States Patent
Sperber et al.

(10) Patent No.: US 11,709,678 B2
(45) Date of Patent: *Jul. 25, 2023

(54) ENABLING REMOVAL AND RECONSTRUCTION OF FLAG OPERATIONS IN A PROCESSOR

(71) Applicant: Intel Corporation, Santa Clara, CA (US)

(72) Inventors: Zeev Sperber, Zichron Yackov (IL); Tomer Weiner, Mahane Miryam (IL); Amit Gradstein, Binyamina (IL); Simon Rubanovich, Haifa (IL); Alex Gerber, Haifa (IL); Itai Ravid, Beit Itzhaq (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,284

(22) Filed: Jun. 1, 2021

(65) Prior Publication Data

US 2021/0357216 A1 Nov. 18, 2021

Related U.S. Application Data

(63) Continuation of application No. 14/930,848, filed on Nov. 3, 2015, now Pat. No. 11,036,509.

(51) Int. Cl.
*G06F 9/30* (2018.01)
*G06F 9/38* (2018.01)

(52) U.S. Cl.
CPC ......... *G06F 9/3016* (2013.01); *G06F 9/3001* (2013.01); *G06F 9/30094* (2013.01);
(Continued)

(58) Field of Classification Search
CPC .... G06F 9/3016; G06F 9/3001; G06F 9/3814; G06F 9/30181; G06F 9/30145;
(Continued)

(56) References Cited

U.S. PATENT DOCUMENTS

| 5,404,487 A | 4/1995 | Murata et al. |
| 5,577,259 A | 11/1996 | Alferness et al. |

(Continued)

FOREIGN PATENT DOCUMENTS

| TW | 201346720 A | 11/2013 |
| TW | 201504943 A | 2/2015 |

OTHER PUBLICATIONS

Patent Cooperation Treaty, International Search Report and Written Opinion dated Jan. 16, 2017 in International Patent Application No. PCT/US2016/055612 (14 pages).

(Continued)

*Primary Examiner* — Keith E Vicary
(74) *Attorney, Agent, or Firm* — Trop, Pruner & Hu, P.C.

(57) ABSTRACT

In one embodiment, a processor includes fetch logic to fetch instructions, decode logic to decode the fetched instructions, and execution logic to execute at least some of the instructions. The decode logic may determine whether a flag portion of a first instruction to be folded is to be performed, and if not, accumulate a first immediate value of the first instruction with a folded immediate value obtained from an entry of an immediate buffer.

20 Claims, 30 Drawing Sheets

(52) U.S. Cl.
CPC ...... *G06F 9/30145* (2013.01); *G06F 9/30167* (2013.01); *G06F 9/384* (2013.01); *G06F 9/3861* (2013.01)

(58) Field of Classification Search
CPC .. G06F 9/30094; G06F 9/3812; G06F 9/3861; G06F 9/30167; G06F 9/384
USPC ........................................................ 712/226
See application file for complete search history.

(56) References Cited

U.S. PATENT DOCUMENTS

| | | | |
|---|---|---|---|
| 5,838,941 A * | 11/1998 | Valentine | G06F 9/30181 |
| | | | 712/216 |
| 6,026,485 A | 2/2000 | O'Connor et al. | |
| 6,775,765 B1 | 8/2004 | Lee et al. | |
| 7,003,629 B1 | 2/2006 | Alsup | |
| 7,043,626 B1 | 5/2006 | McMinn et al. | |
| 7,458,069 B2 * | 11/2008 | Ronen | G06F 9/30123 |
| | | | 712/E9.037 |
| 7,694,110 B1 | 4/2010 | Alsup et al. | |
| 7,849,292 B1 | 12/2010 | Ashcraft et al. | |
| 10,705,964 B2 | 7/2020 | Doshi et al. | |
| 11,036,509 B2 * | 6/2021 | Sperber | G06F 9/3832 |
| 2001/0004757 A1 | 6/2001 | Miyake et al. | |
| 2003/0046519 A1 | 3/2003 | Richardson | |
| 2010/0312989 A1 | 12/2010 | Hardage | |
| 2012/0284489 A1 * | 11/2012 | Plondke | G06F 9/30192 |
| | | | 712/226 |
| 2012/0311304 A1 | 12/2012 | Tomono et al. | |
| 2013/0067199 A1 | 3/2013 | Henry et al. | |
| 2014/0149722 A1 | 5/2014 | Brown et al. | |
| 2015/0024548 A1 | 1/2015 | Farooq et al. | |
| 2015/0261537 A1 | 9/2015 | Cha et al. | |
| 2015/0339177 A1 | 11/2015 | Heisswolf et al. | |
| 2017/0123799 A1 | 5/2017 | Sperber et al. | |
| 2020/0201632 A1 * | 6/2020 | Mekkat | G06F 9/384 |

OTHER PUBLICATIONS

Taiwanese Patent Office, Search Report dated Jun. 8, 2020 in Taiwan Patent Application No. 105131648 (9 pages).
Petrie et al., "RENO: A Rename-Based Instruction Optimizer", Proceedings of the 32nd International Symposium on Computer Architecture 2005, pp. 98-109.
Kim et al."Advanced POC model-based Java instruction folding mechanism", Conference Proceedings of the Euromico, Sep. 5-7, 2000, vol. 1, pp. 332-338.
Yiyu et al. "An Instruction Folding Solution to a Java Processor", Network and Parallel Computing, IFIP International Conference, NPC 2007, Dalian, China, Sep. 18-21, 2007, 24(3), pp. 415-424.
Oi, "Instruction folding in a hardware-translation based java virtual machine", Proceedings of the 3rd conference on Computing Frontiers, May 2006, pp. 139-146.
Santti et al., "Instruction Folding for an Asynchronous Java Co-Processor", 2005 International Symposium on System-on-Chip, Tampere, Finland, Nov. 17, 2005, pp. 18-21.
El-Kharashi et al., "A robust stack folding approach for Java processors: an operand extraction-based algorithm", Journal of Systems Architecture, vol. 47, Issue 8, 2001, pp. 697-726.

* cited by examiner

| 127 120 | 119 112 | 111 104 | 103 | | 24 | 23 16 | 15 8 | 7 0 |
|---|---|---|---|---|---|---|---|---|
| sbbb bbbb | sbbb bbbb | sbbb bbbb | ● | ● | ● | sbbb bbbb | sbbb bbbb | sbbb bbbb |

Unsigned Packed Byte Representation 344

| 127 120 | 119 112 | 111 104 | 103 | | 24 | 23 16 | 15 8 | 7 0 |
|---|---|---|---|---|---|---|---|---|
| sbbb bbbb | sbbb bbbb | sbbb bbbb | ● | ● | ● | sbbb bbbb | sbbb bbbb | sbbb bbbb |

Signed Packed Byte Representation 345

| 127 112 | 111 | | 16 | 15 0 |
|---|---|---|---|---|
| wwww wwww wwww wwww | ● | ● | ● | wwww wwww wwww wwww |

Unsigned Packed Word Representation 346

| 127 112 | 111 | | 16 | 15 0 |
|---|---|---|---|---|
| swww wwww wwww wwww | ● | ● | ● | swww wwww wwww wwww |

Signed Packed Word Representation 347

| 127 92 | 91 | 32 | 31 0 |
|---|---|---|---|
| dddd dddd dddd dddd dddd dddd dddd dddd | ● ● ● | | dddd dddd dddd dddd dddd dddd dddd dddd |

Unsigned Packed Doubleword Representation 348

| 127 92 | 91 | 32 | 31 0 |
|---|---|---|---|
| sddd dddd dddd dddd dddd dddd dddd dddd | ● ● ● | | sddd dddd dddd dddd dddd dddd dddd dddd |

Signed Packed Doubleword Representation 349

FIG. 3C

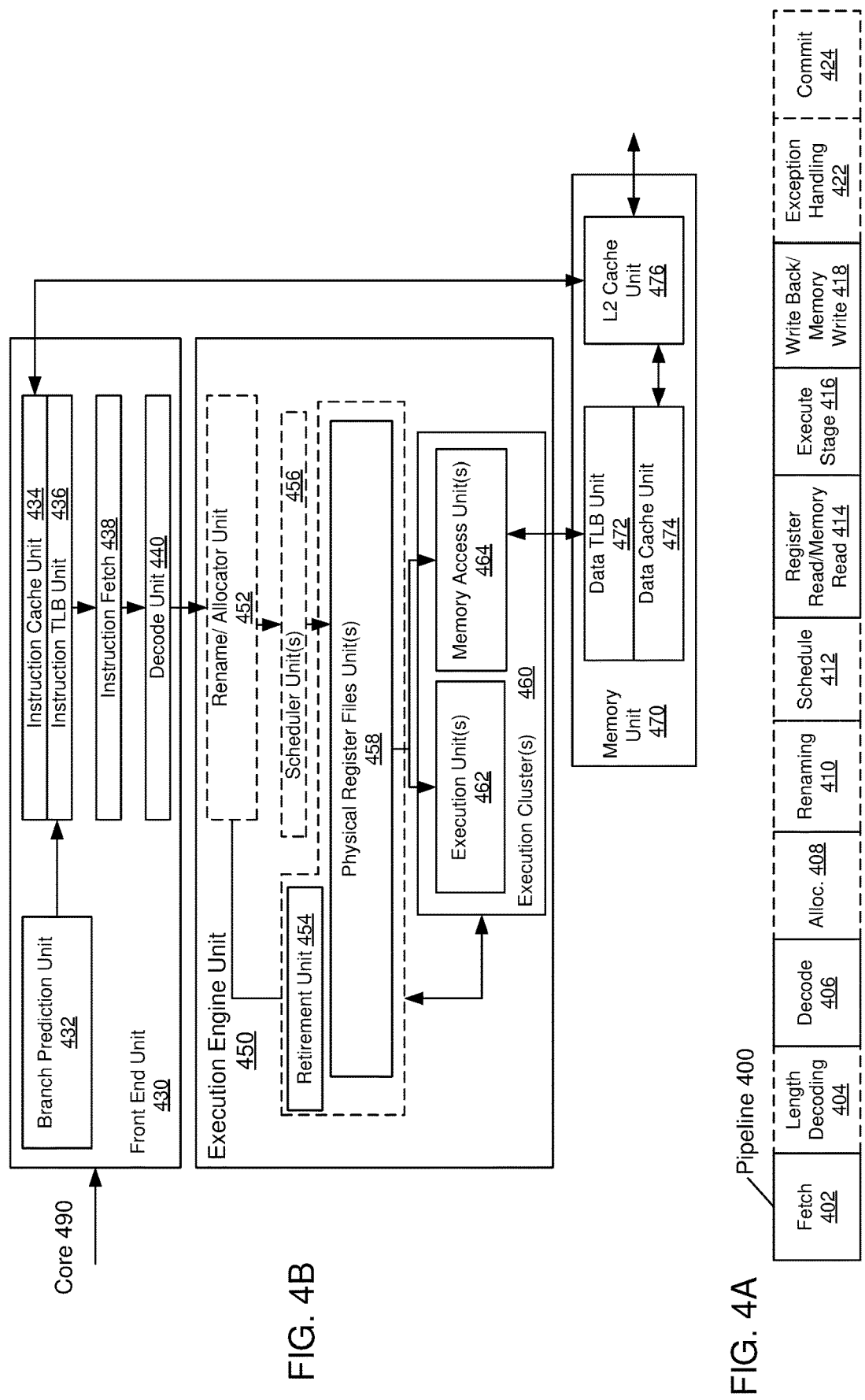

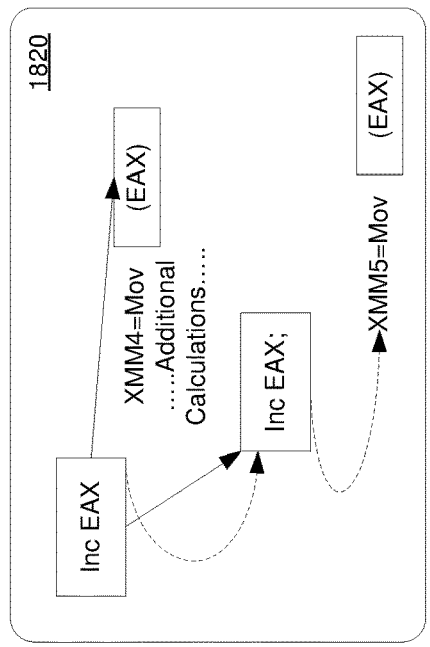
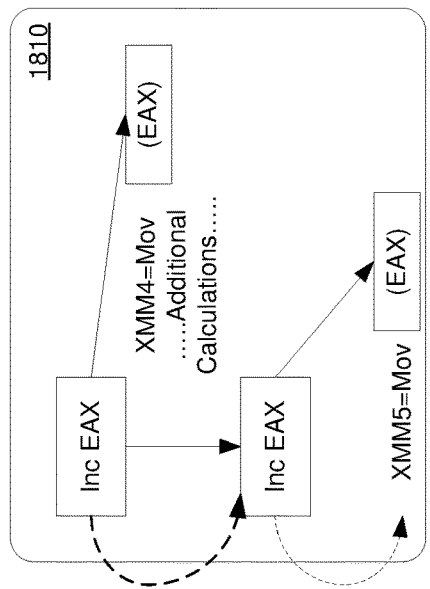
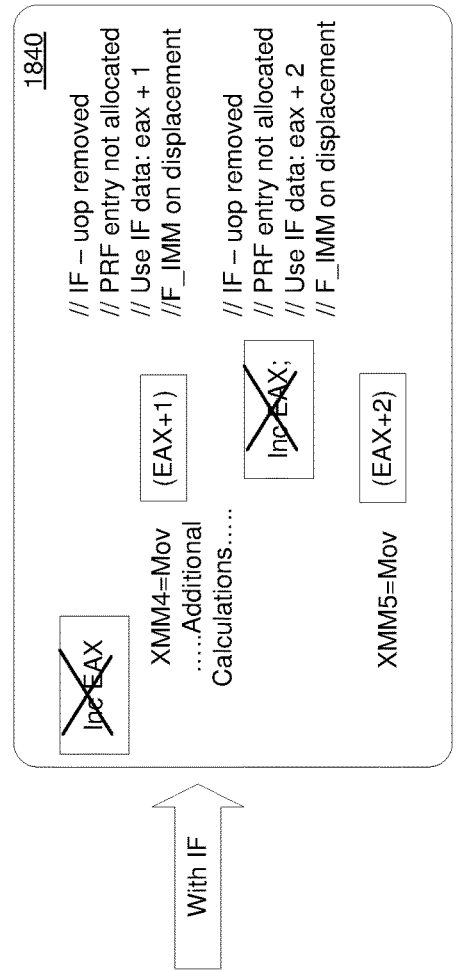
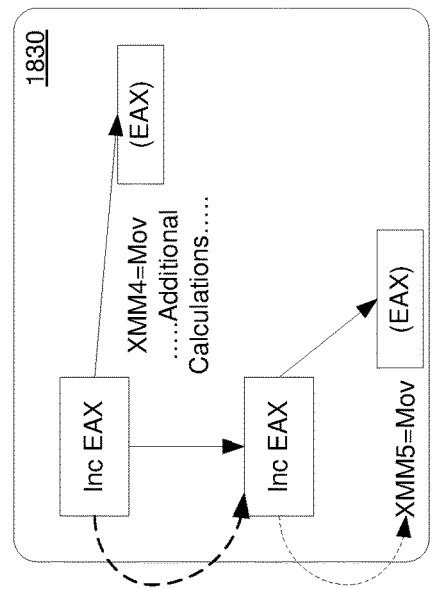
FIG. 18A
FIG. 18B

US 11,709,678 B2

ENABLING REMOVAL AND RECONSTRUCTION OF FLAG OPERATIONS IN A PROCESSOR

This application is a continuation of U.S. patent application Ser. No. 14/930,848, filed Nov. 3, 2015, entitled "Enabling Removal and Reconstruction of Flag Operations in a Processor", the content of which is hereby incorporated by reference.

FIELD OF INVENTION

The present disclosure pertains to the field of processing logic, microprocessors, and associated instruction set architecture that, when executed by the processor or other processing logic, perform logical, mathematical, or other functional operations.

BACKGROUND

In modern processor instruction set architectures (ISAs), many integer addition operations operate on an integer register and an immediate value, which is a value provided with an instruction. Such instructions can be used in a wide variety of circumstances. In some cases, dependencies are created by inclusion of such instructions. These dependencies can adversely affect processor performance. Some instructions also include flag operations to provide status information regarding instruction execution. Execution of flag operations can also impact processor performance.

BRIEF DESCRIPTION OF THE DRAWINGS

FIG. 3C illustrates various signed and unsigned packed data type representations in multimedia registers, in accordance with embodiments of the present disclosure.

FIG. 4A is a block diagram illustrating an in-order pipeline and a register renaming stage, out-of-order issue/execution pipeline, in accordance with embodiments of the present disclosure.

FIG. 4B is a block diagram illustrating an in-order architecture core and a register renaming logic, out-of-order issue/execution logic to be included in a processor, in accordance with embodiments of the present disclosure.

FIG. 18A is an arrangement of code having loop-based operation.

FIG. 18B is an arrangement of code having loop-based operation in accordance with one embodiment of the present invention.

DETAILED DESCRIPTION

Embodiments further enable removal of flag operations associated with instructions. Such folding of flag operations can be for instructions that are folded. Still further in some cases, such flag removal also may be realized for instructions that are executed in an execution logic of a pipeline, where it can be identified that the flag result of such instructions are not to be consumed.

It is possible that a flag result of a folded instruction later may need to be consumed, for example, in the case of recovering from a fault or other error. Accordingly, embodiments further provide techniques for flag reconstruction such that even though a flag operation is not conventionally performed, the underlying information is maintained such that a flag result can be later reconstructed.

In certain instruction set architectures (ISAs) such as the x86 ISA, many integer operations generate flags that are rarely consumed by any other operation. Embodiments may determine when such flag operations can be removed, increasing performance (e.g., increased IPC). In the case of folded instructions, to completely remove uops associated with such instructions from the processor pipeline, flag results of such operations also may be removed. Other situations for flag removal may include a constant value like an all ones idiom. In case state of an instruction is to be resolved and the flags are represented by a silent operation, embodiments provide a technique to enable the flag values to be reconstructed. While one technique described herein is a microcode-based technique, understand that embodiments are not limited in this regard.

To realize flag folding, instructions and associated flags generation and flags consumer operations may be defined. In case a flag is not consumed, it can be silently squashed and replaced by a representation that can be restored in case the flags state is to be restored. By only calculating flags when needed, instead of on every operation, increased IPC can be achieved.

Figure 1A:
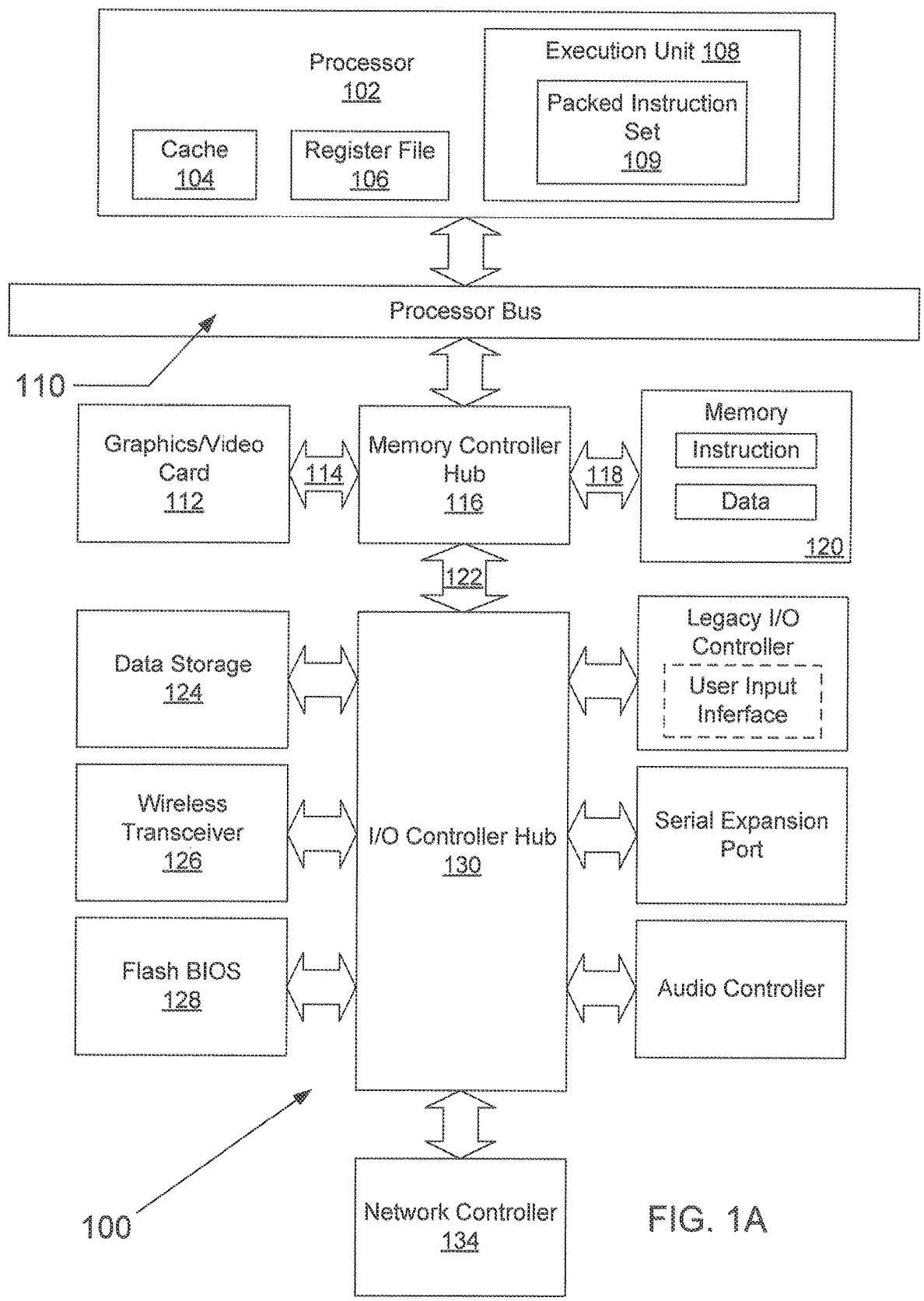
FIG. 1A is a block diagram of an exemplary computer system formed with a processor that may include execution units to execute an instruction, in accordance with embodiments of the present disclosure.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM™ III, PENTIUM™ 4, Xeon™, Itanium™, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS' operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
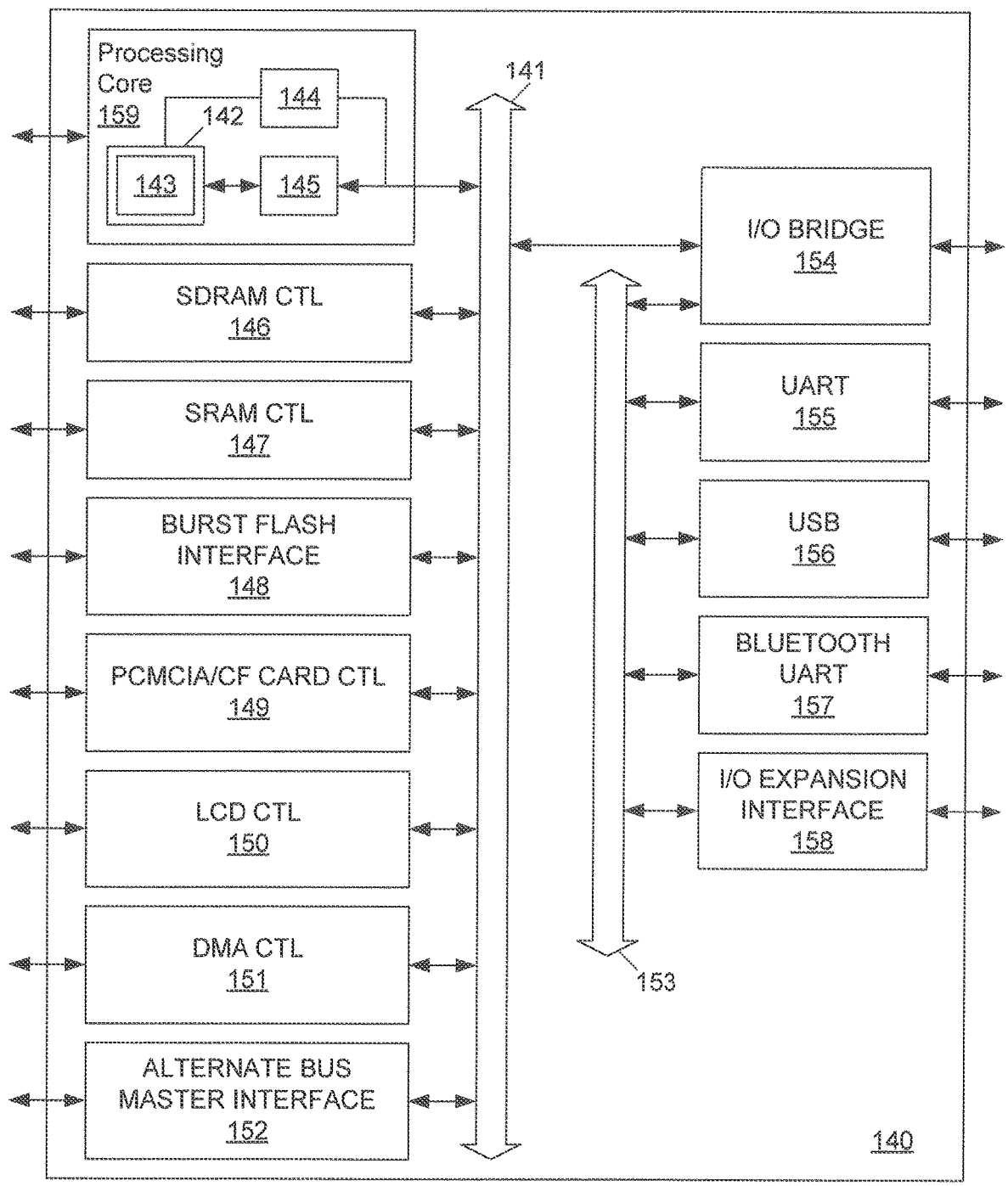
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
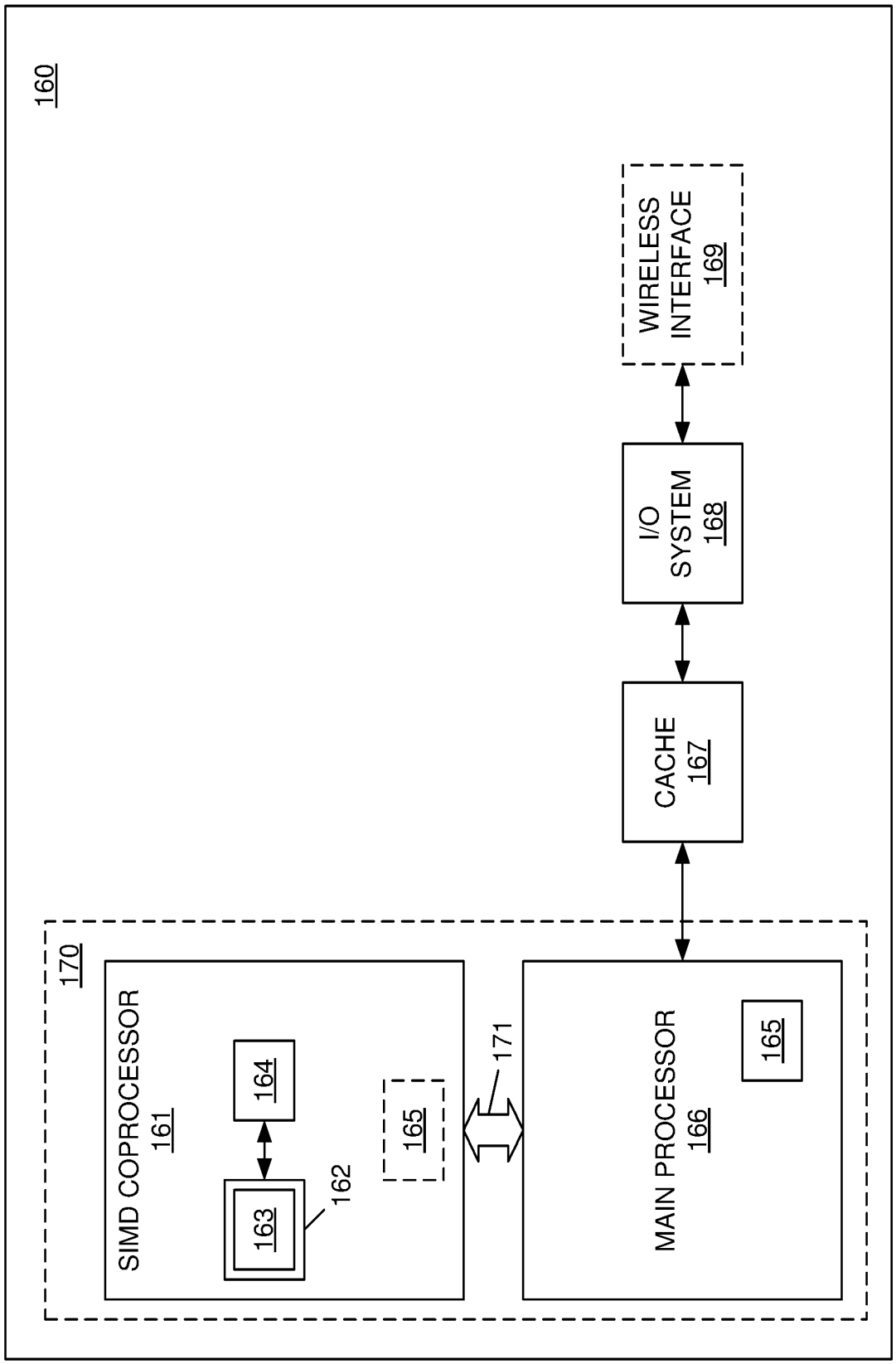
FIG. 1C illustrates another embodiment of a data processing system to perform operations in accordance with embodiments of the present disclosure.

FIG. 1C illustrates another embodiment of a data processing system to perform operations in accordance with embodiments of the present disclosure. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
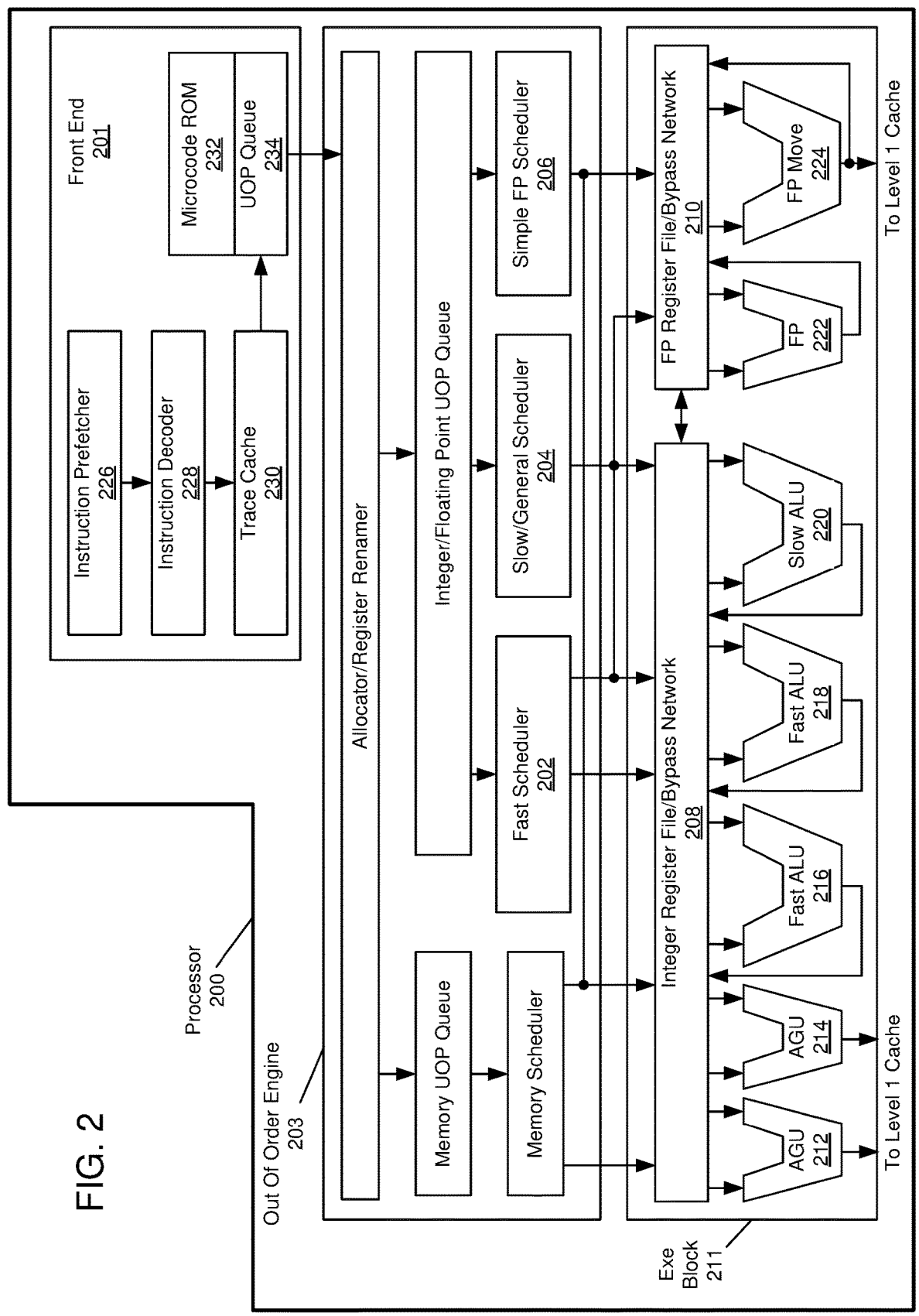
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
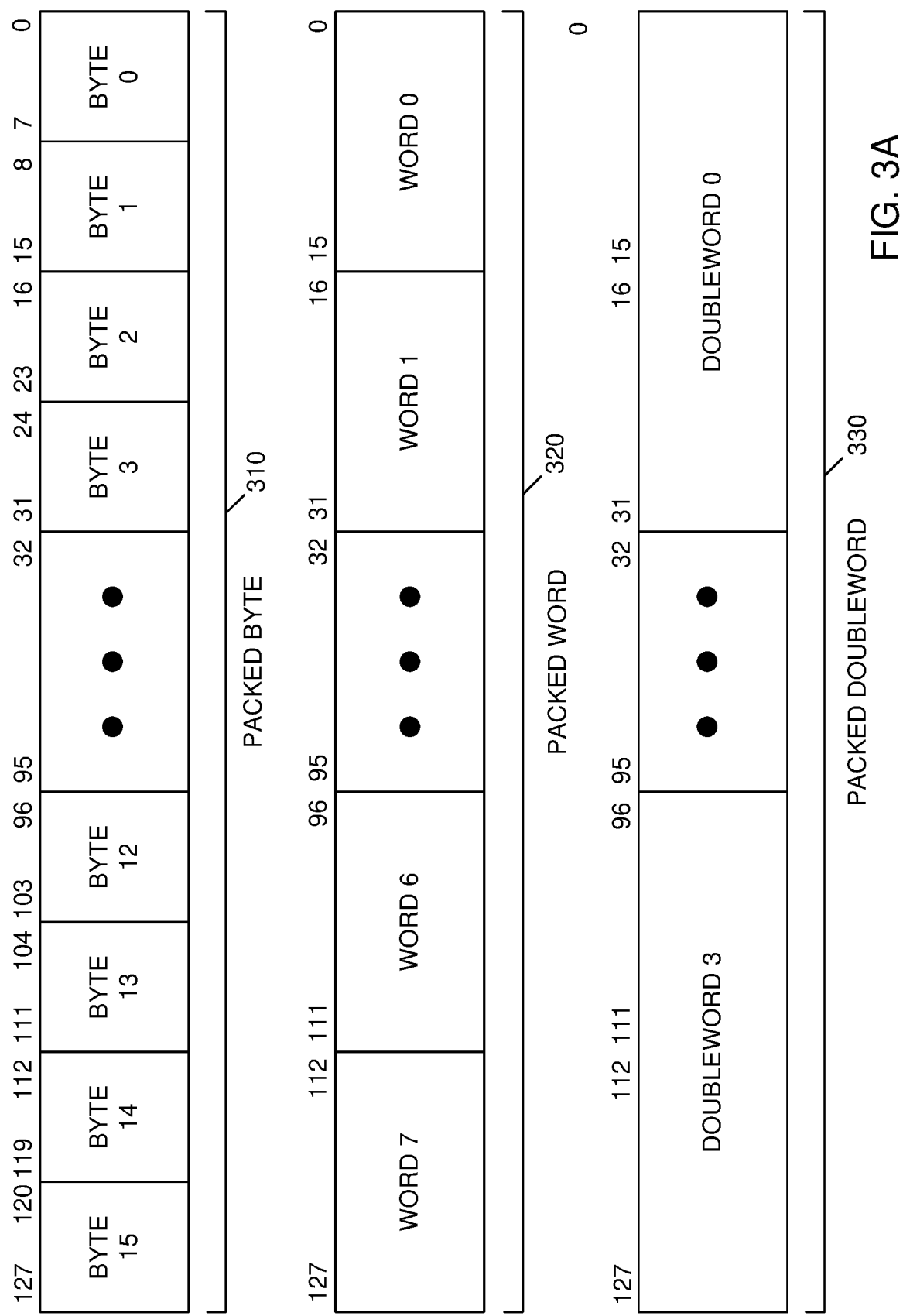
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

Figure 3B:
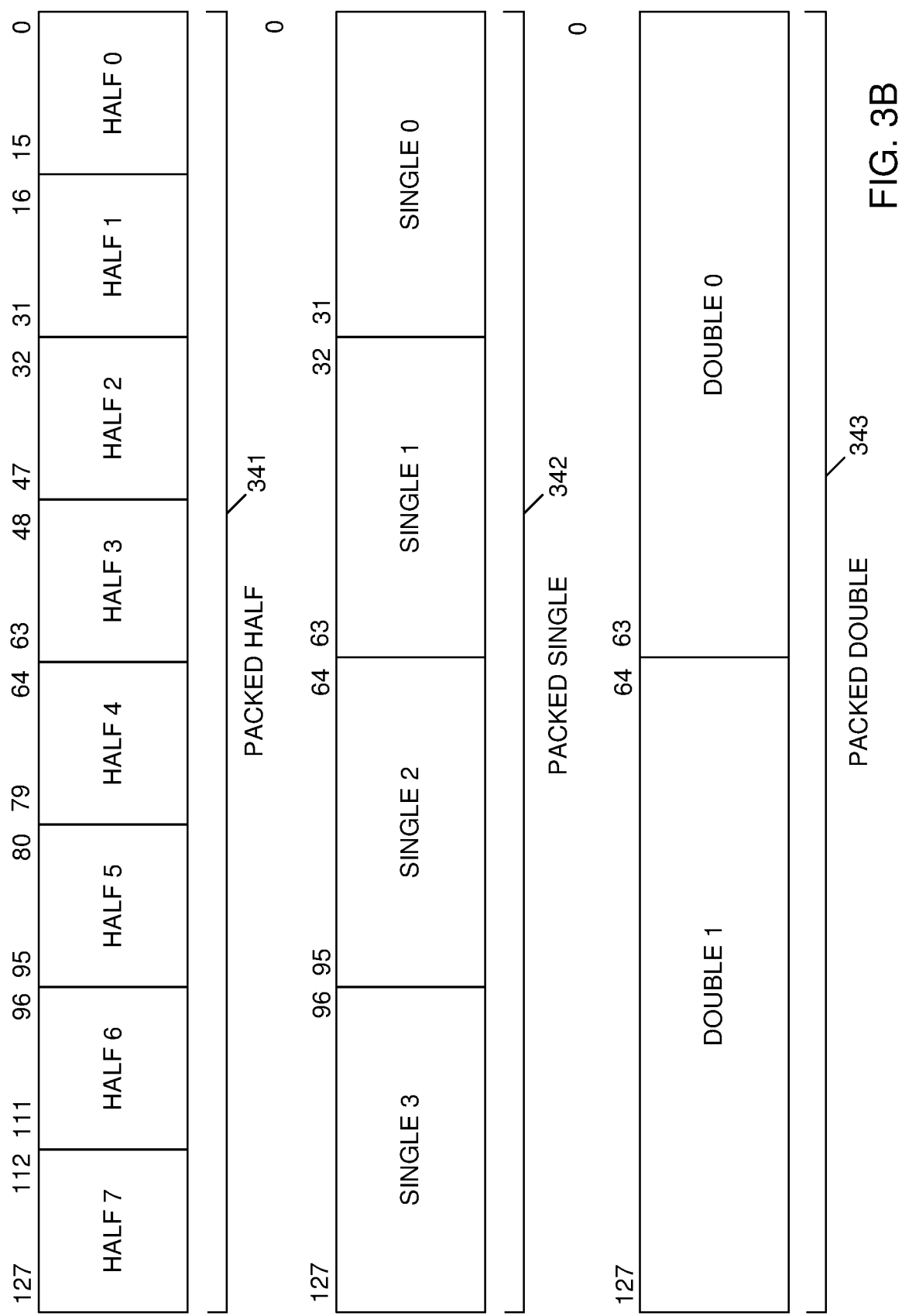
FIG. 3B illustrates possible in-register data storage formats, in accordance with embodiments of the present disclosure.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

Figure 3D:
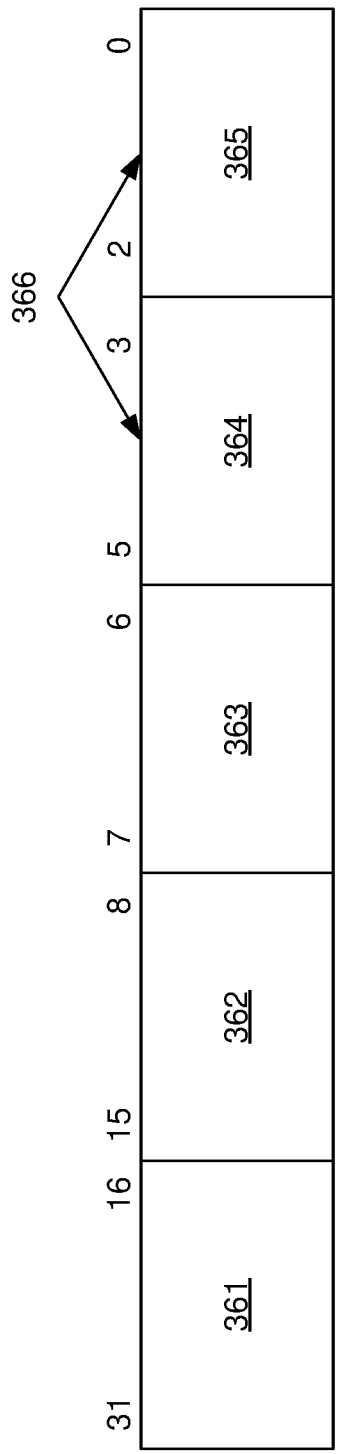
FIG. 3D illustrates an embodiment of an operation encoding format.

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

Figure 3E:
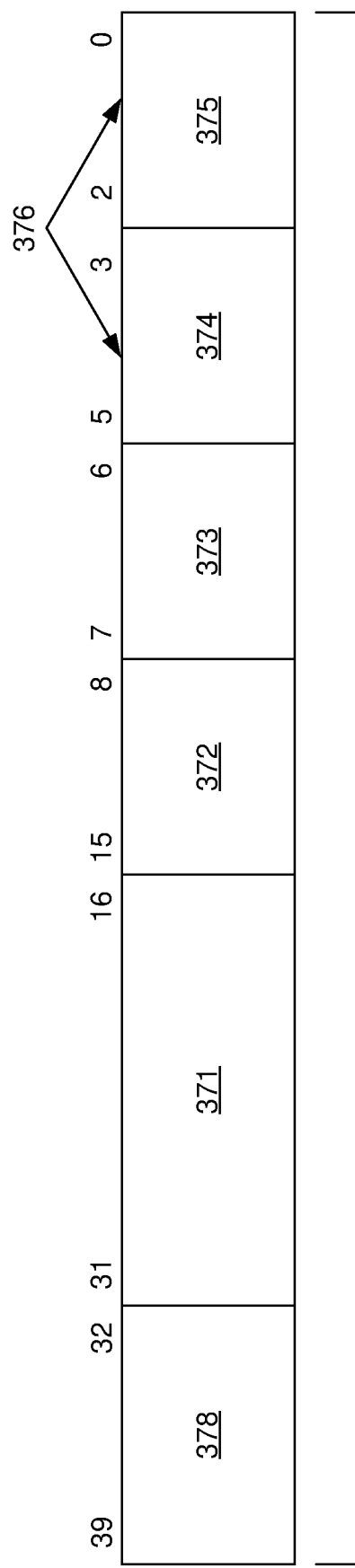
FIG. 3E illustrates another possible operation encoding format having forty or more bits, in accordance with embodiments of the present disclosure.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
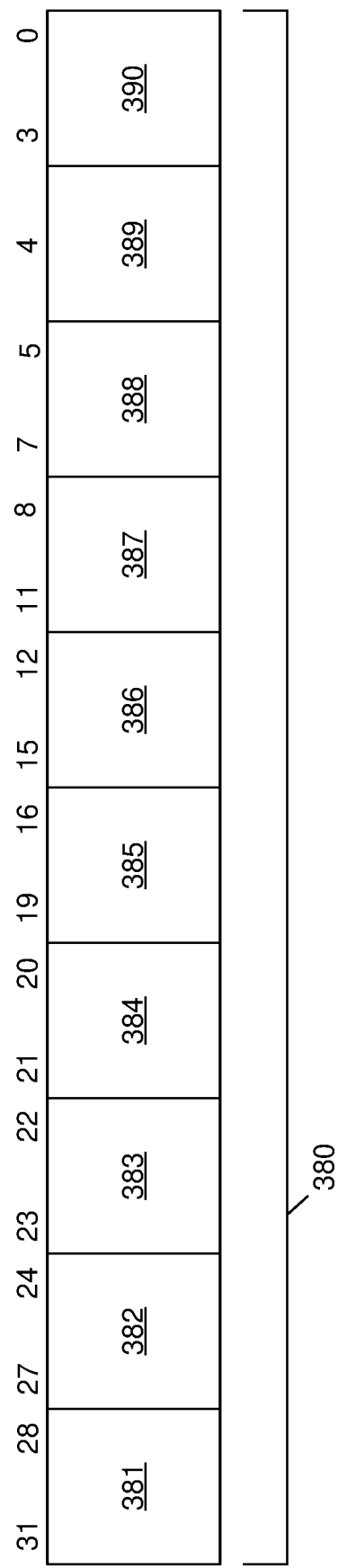
FIG. 3F illustrates yet another possible operation encoding format, in accordance with embodiments of the present disclosure.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 an0064 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a writeback/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 154 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Figure 5A:
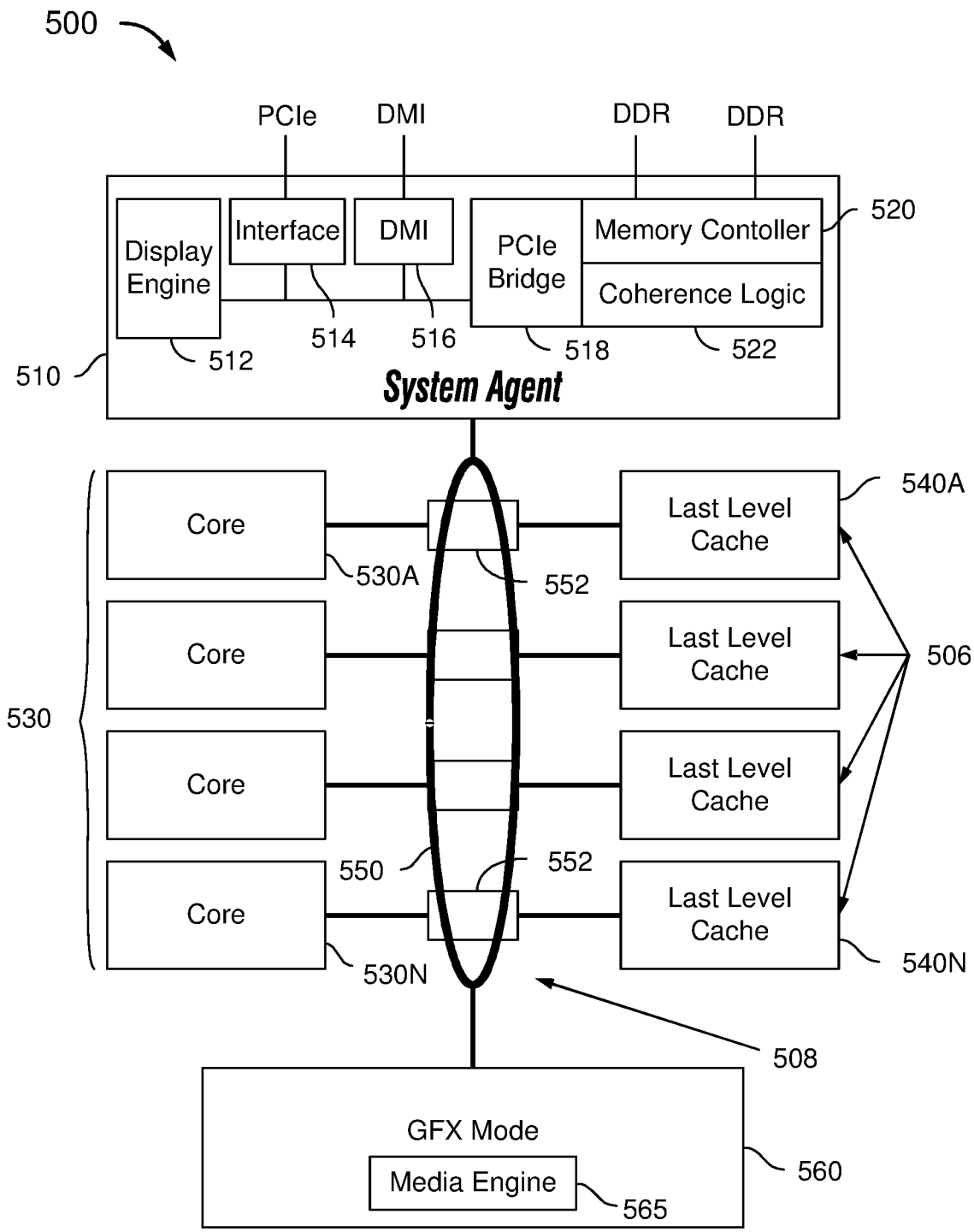
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 514 for communications busses for graphics. In one embodiment, interface 514 may be implemented by PCI Express (PCIe). In a further embodiment, interface 1214 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
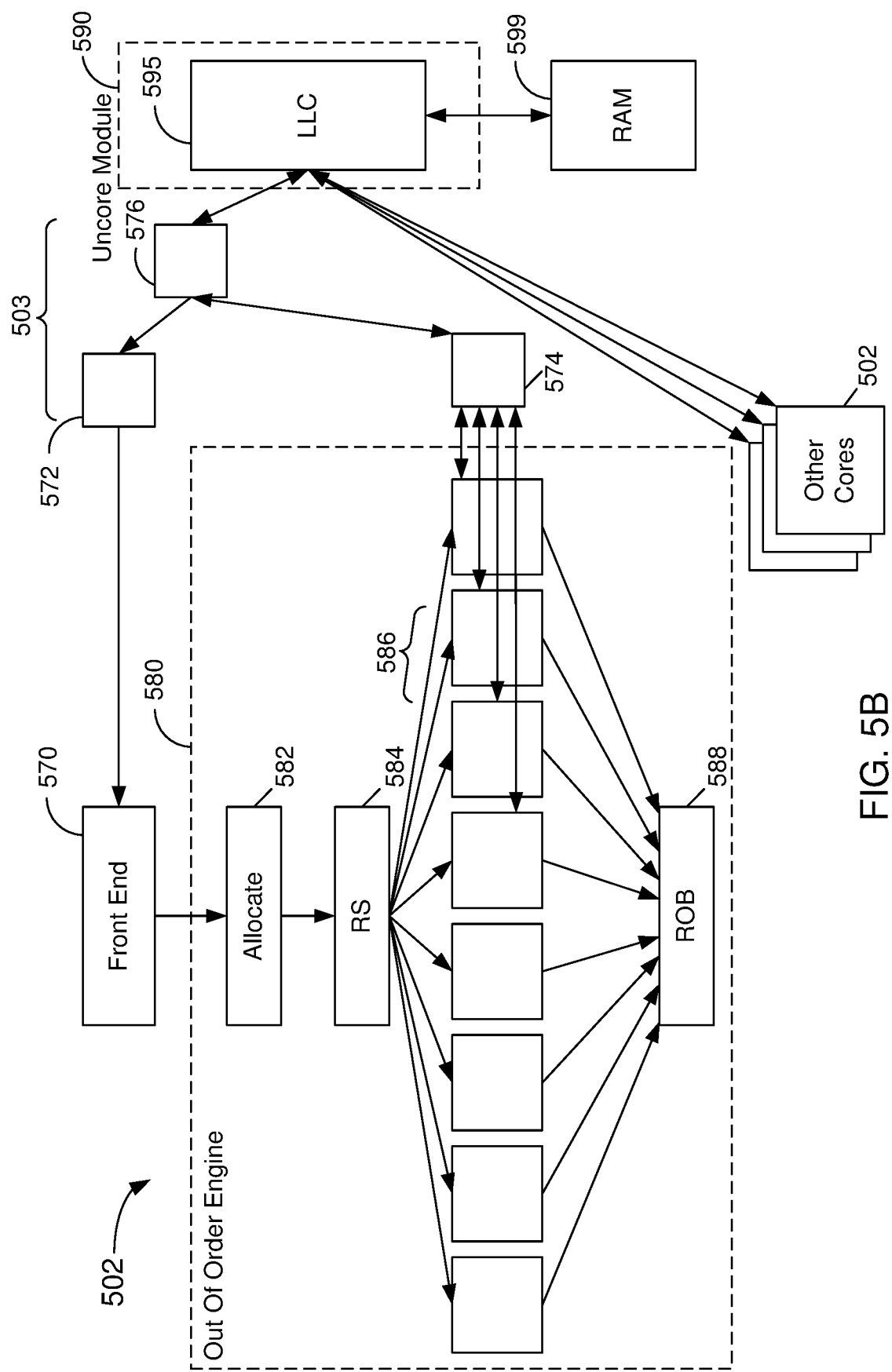
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574, 576. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
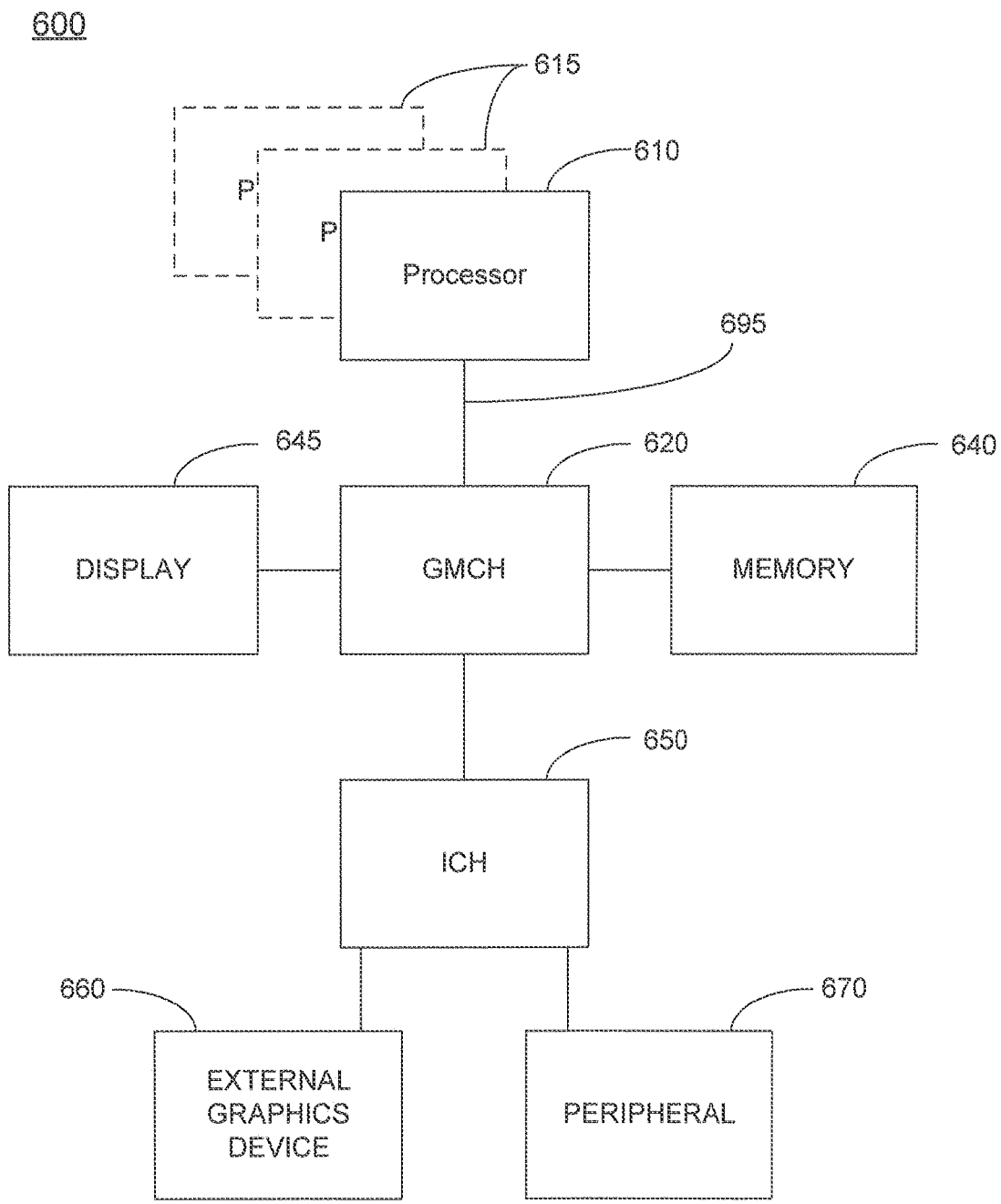
FIG. 6 is a block diagram of a system, in accordance with embodiments of the present disclosure.
Figure 7:
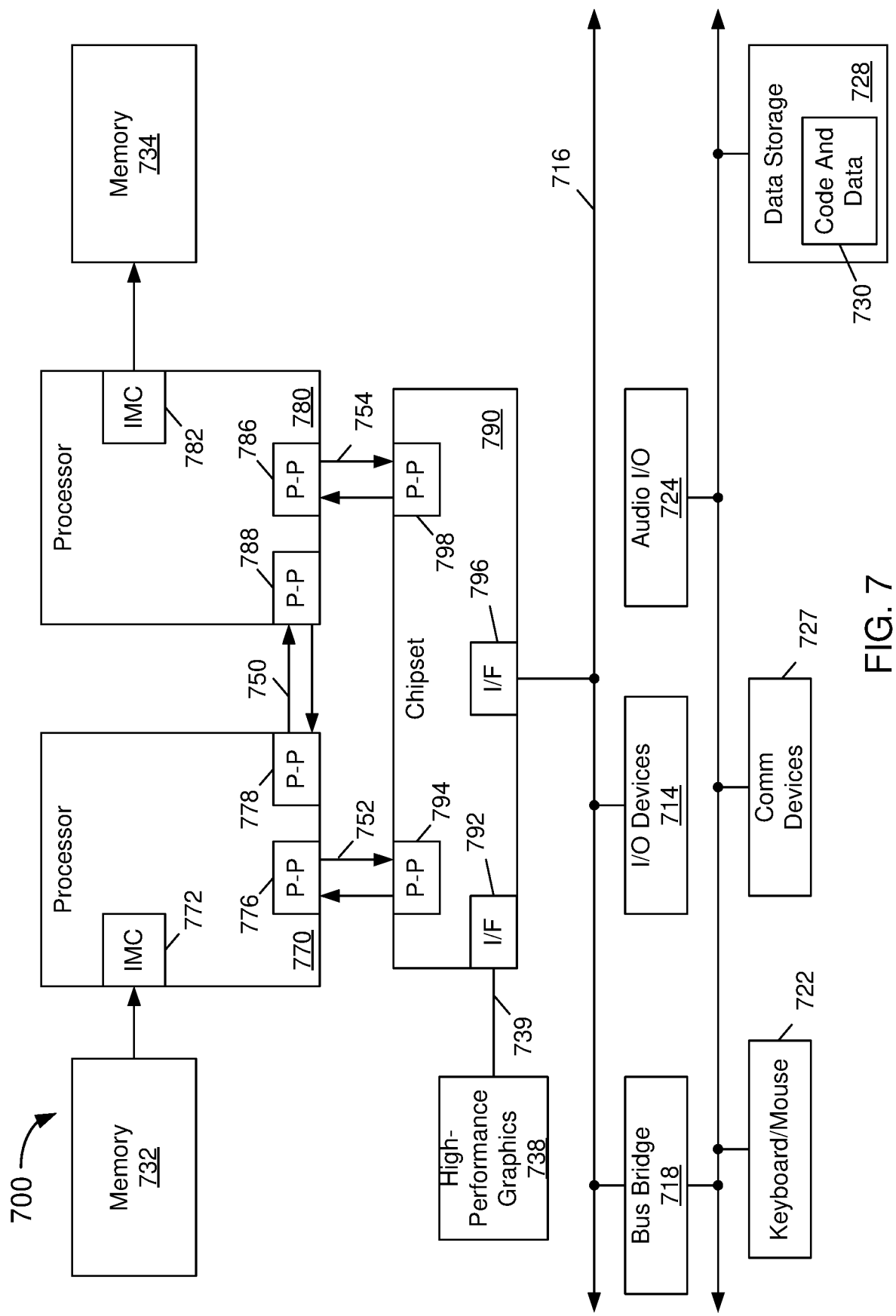
FIG. 7 is a block diagram of a second system, in accordance with embodiments of the present disclosure.
Figure 8:
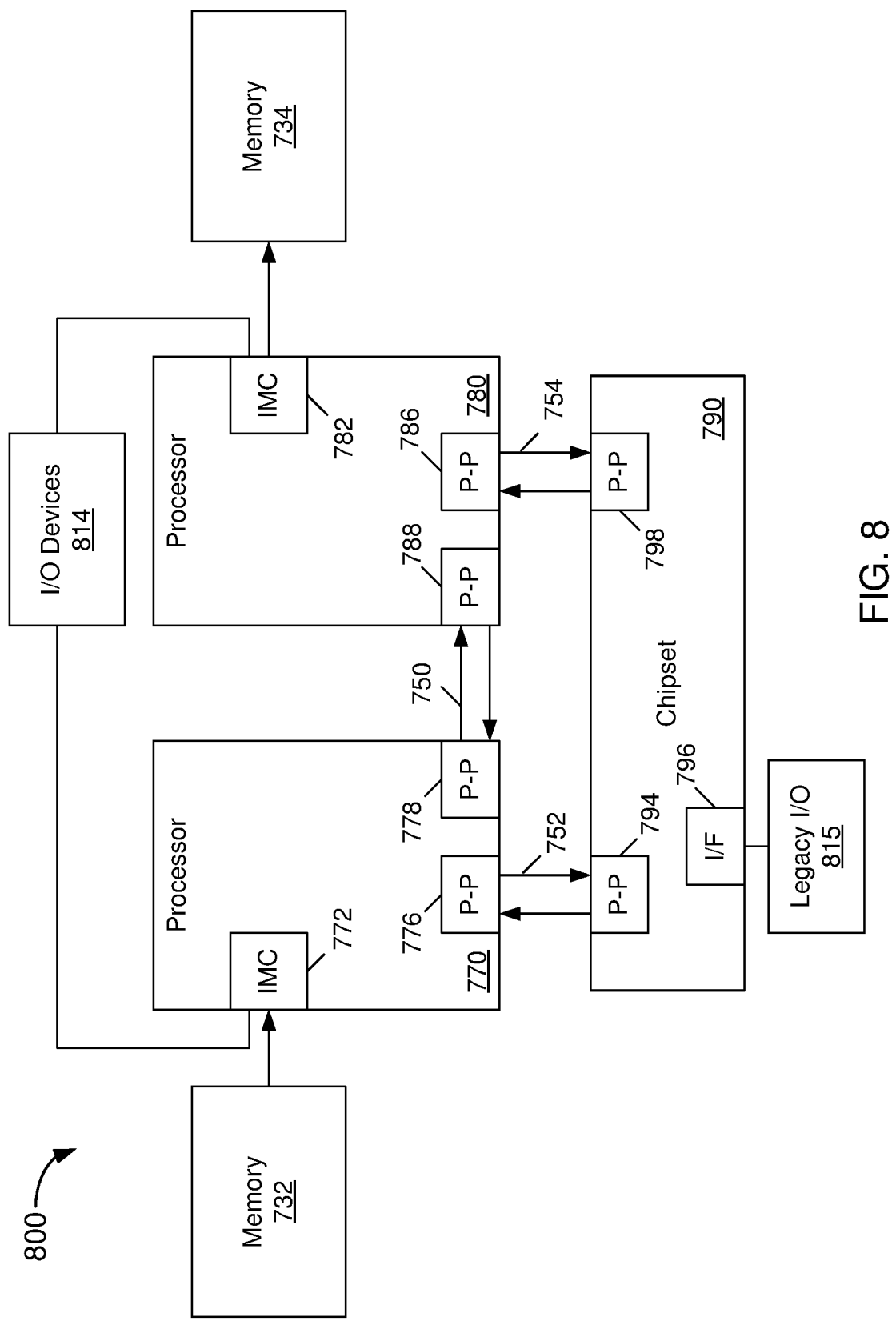
FIG. 8 is a block diagram of a third system in accordance with embodiments of the present disclosure.
Figure 9:
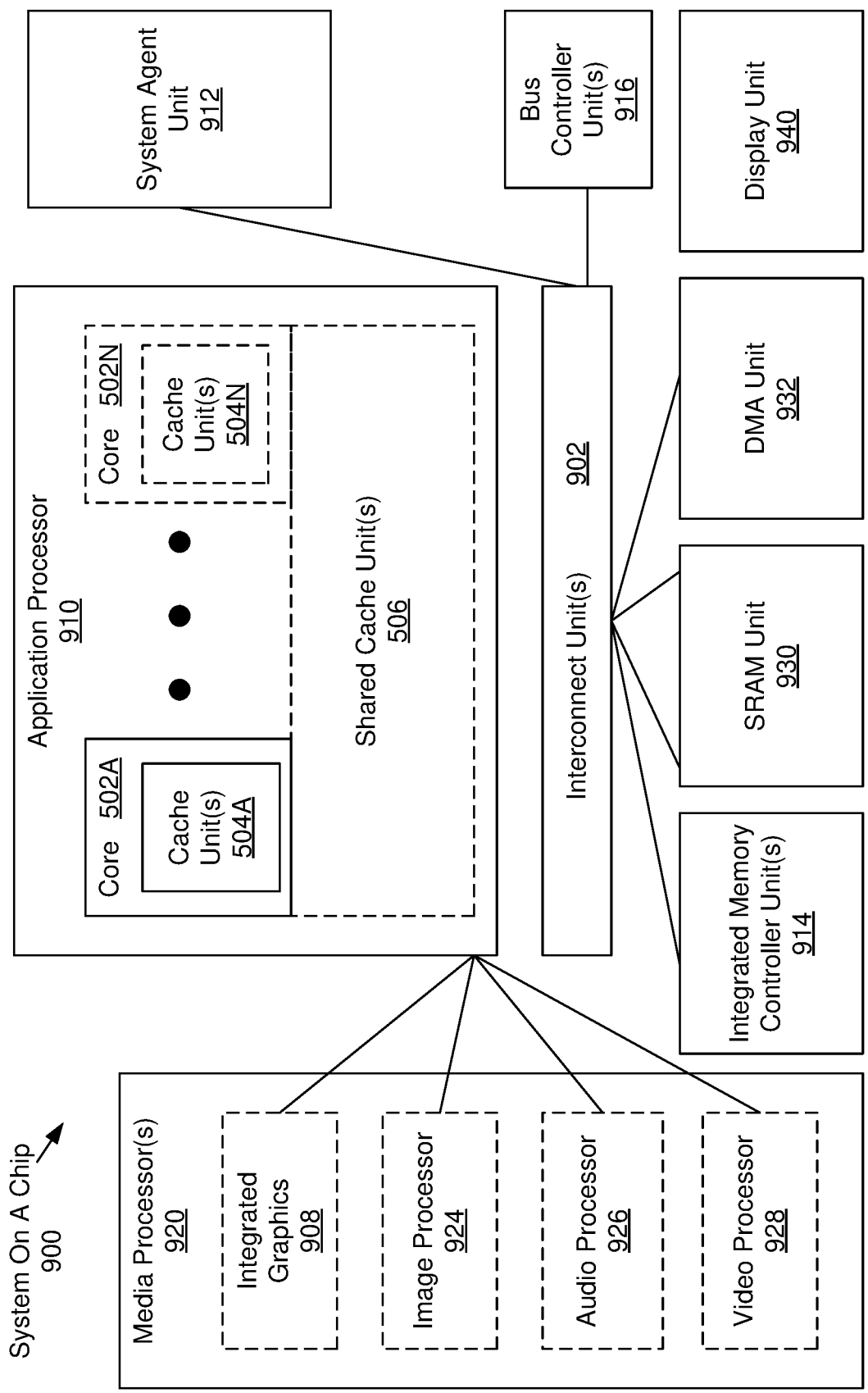
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include be a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739 and interface 792.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory controllers ("IMCs") 772 and 782, respectively. For at least one embodiment, IMCs 772, 782 may include integrated memory controller units such as that described above in connection with FIGS. 5 and 7. In addition, IMCs 772, 782 may also include I/O control logic. FIG. 8 illustrates that not only memories 732, 734 may be coupled to IMCs 772, 782, but also that I/O devices 814 may also be coupled to IMCs 772, 782. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N and shared cache units 506; a system agent unit 912; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays.

Figure 10:
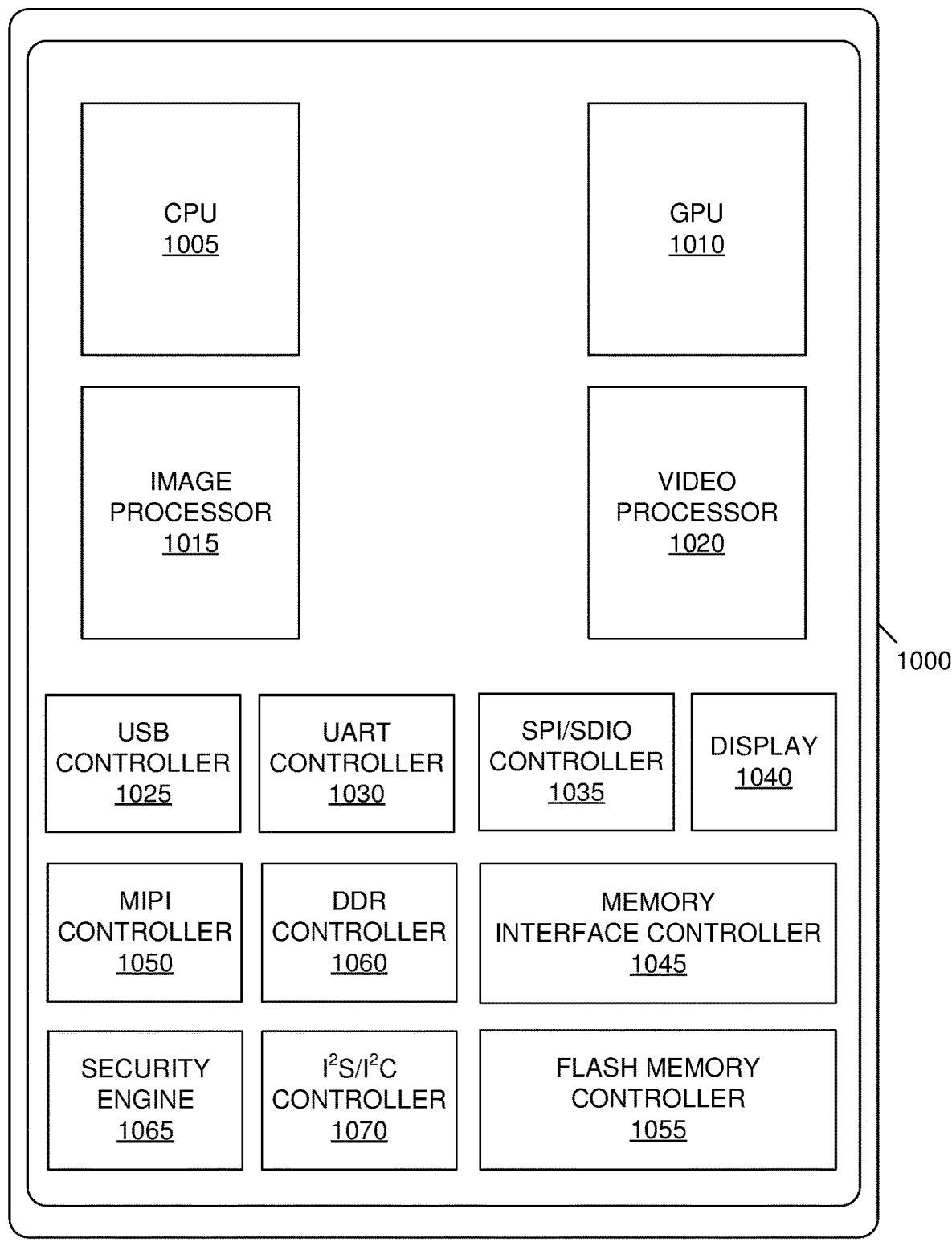
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the CortexTM family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
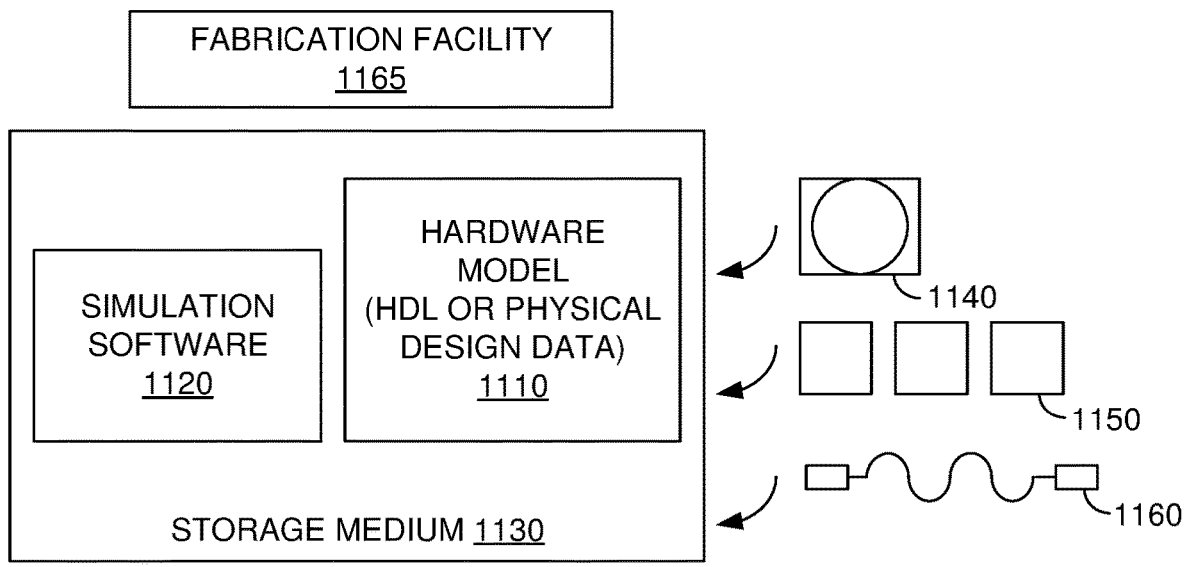
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1130 may include simulation software 1120 and/or hardware or software model 1110. In one embodiment, the data representing the IP core design may be provided to storage 1130 via memory 1140 (e.g., hard disk), wired connection (e.g., internet) 1150 or wireless connection 1160. The IP core information generated by the simulation tool and model may then be transmitted to a fabrication facility 1165 where it may be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
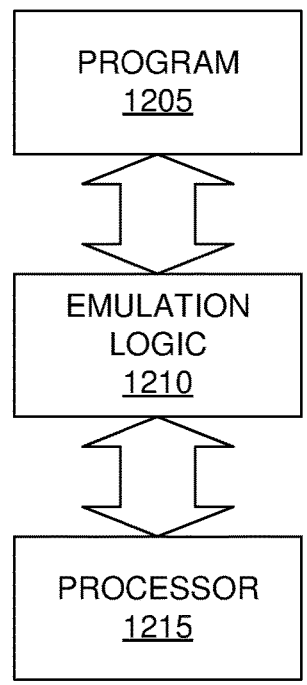
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
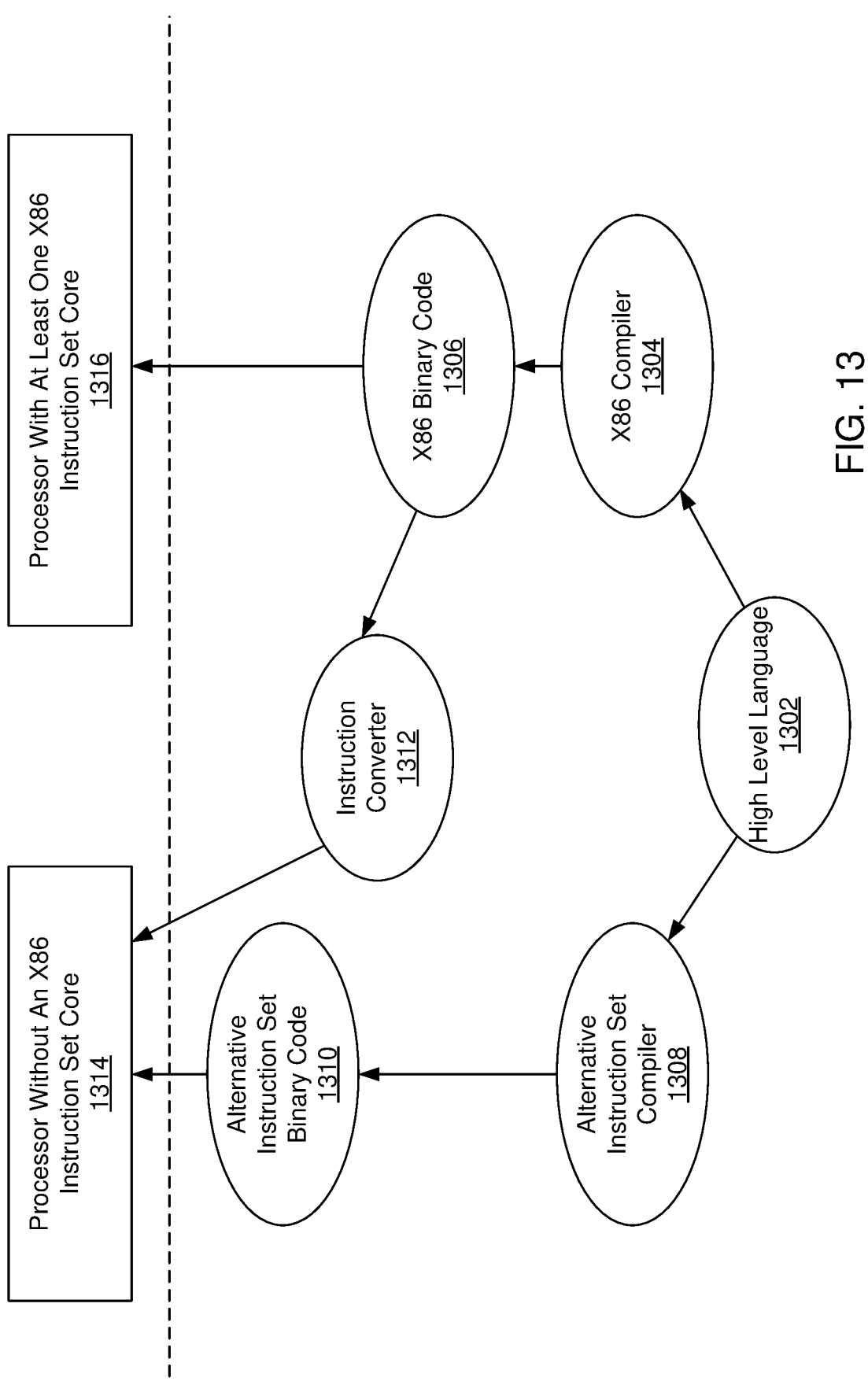
FIG. 13 illustrates a block diagram contrasting the use of a software instruction converter to convert binary instructions in a source instruction set to binary instructions in a target instruction set, in accordance with embodiments of the present disclosure.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.).

The instruction converter 1312 is used to convert the x86 binary code 1306 into alternative instruction set binary code 1311 that may be natively executed by the processor without an x86 instruction set core 1314. This converted code may or may not be the same as the alternative instruction set binary code 1310 resulting from an alternative instruction set compiler 1308; however, the converted code will accomplish the same general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Figure 14:
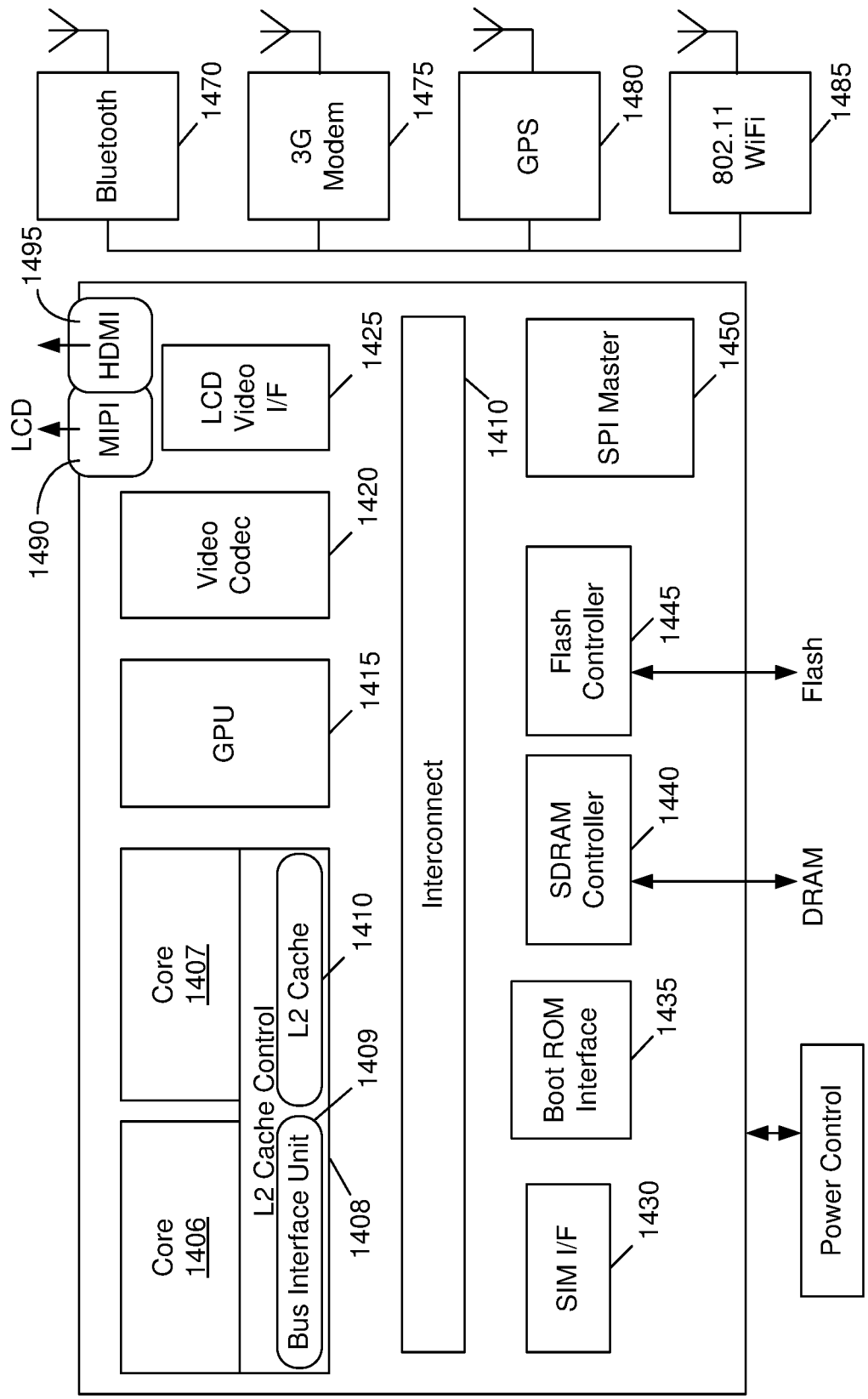
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1410. Cores 1406, 1407 and graphics processing unit 1415 may be communicatively coupled to each other and to the remainder of instruction set architecture 1400 through interconnect 1410. In one embodiment, graphics processing unit 1415 may use a video codec 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module. Flash controller 1445 may provide access to or from memory such as flash memory or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
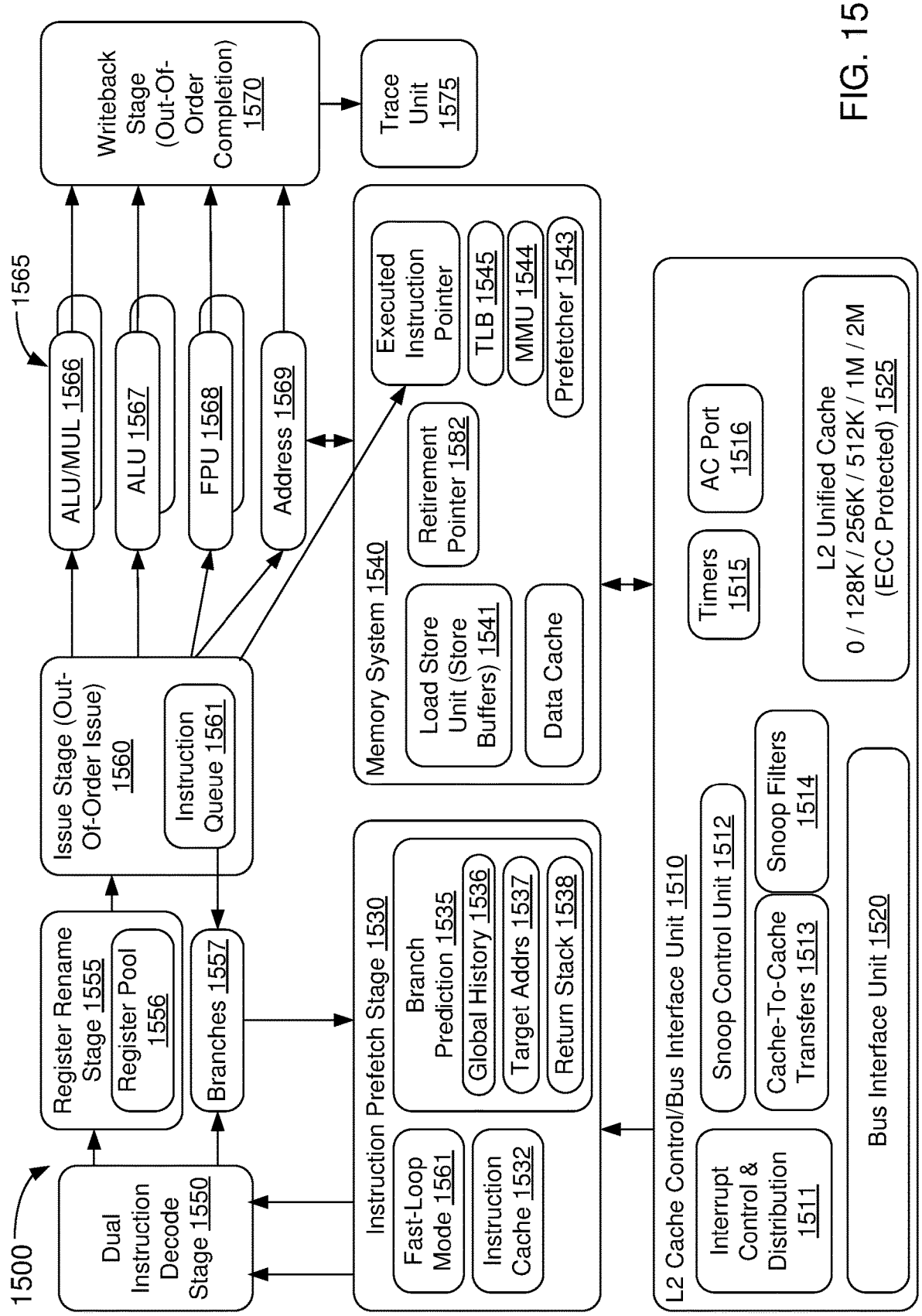
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1564 may be performed by one or more stages of execution. Such stages may include, for example, instruction prefetch stage 1530, dual instruction decode stage 1550, register rename stage 1555, issue stage 1560, and writeback stage 1570.

In another embodiment, memory system 1540 may include a retirement pointer 1582. Retirement pointer 1582 may store a value identifying the program order (PO) of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128k, 256k, 512k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, unit 1510 may include an interrupt control and distribution unit 1511 for generating interrupts and other communications to other portions of a processor or electronic device. In one embodiment, unit 1510 may include a snoop control unit 1512 that handles cache access and coherency for multiple processing cores. In a further embodiment, to provide such functionality, snoop control unit 1512 may include a cache-to-cache transfer unit 1513 that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1541 for storing information such as buffers written to or read back from memory or registers. In another embodiment, memory system 1540 may include a translation lookaside buffer (TLB) 1545 that provides look-up of address values between physical and virtual addresses. In yet another embodiment, memory system 1540 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
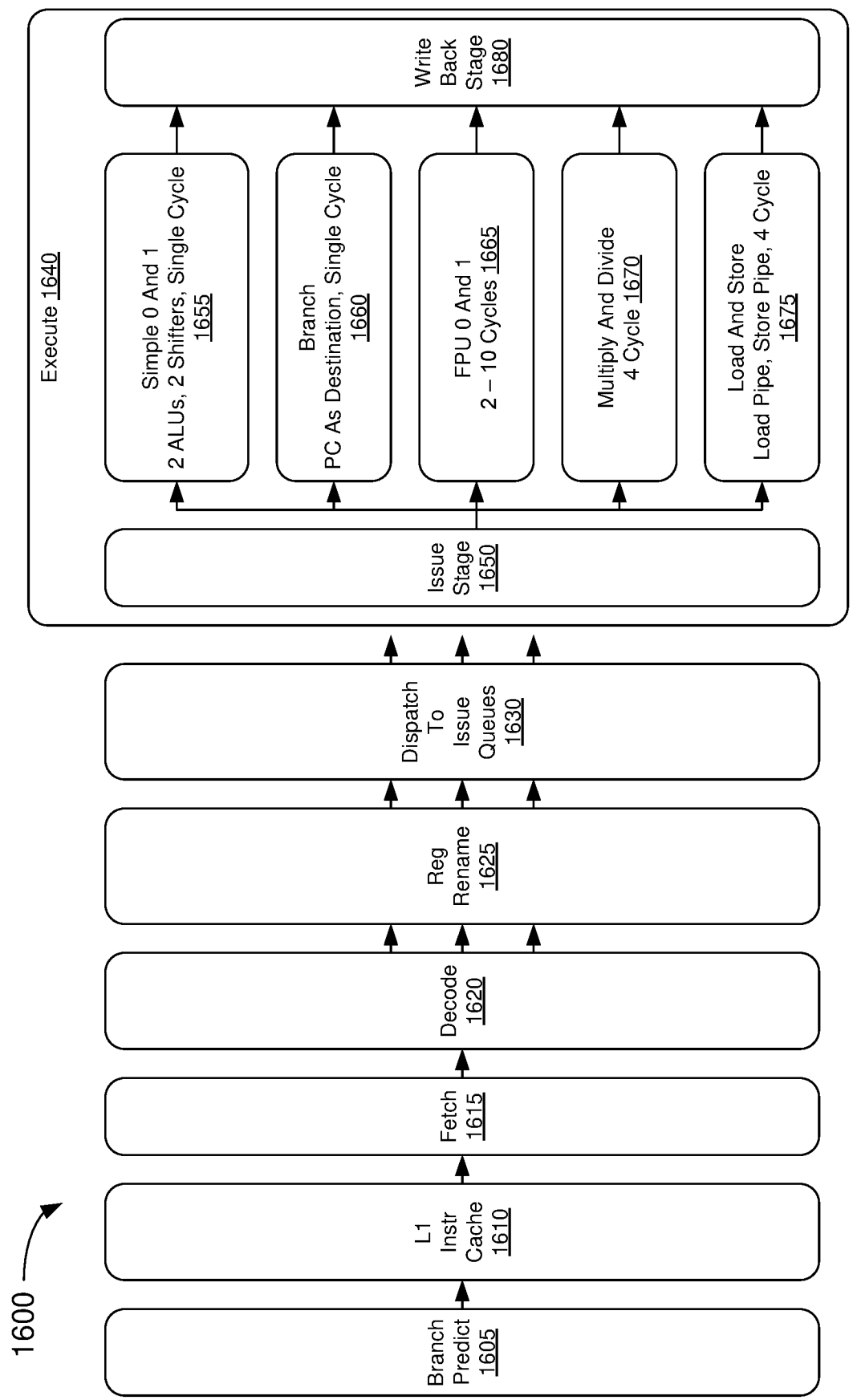
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
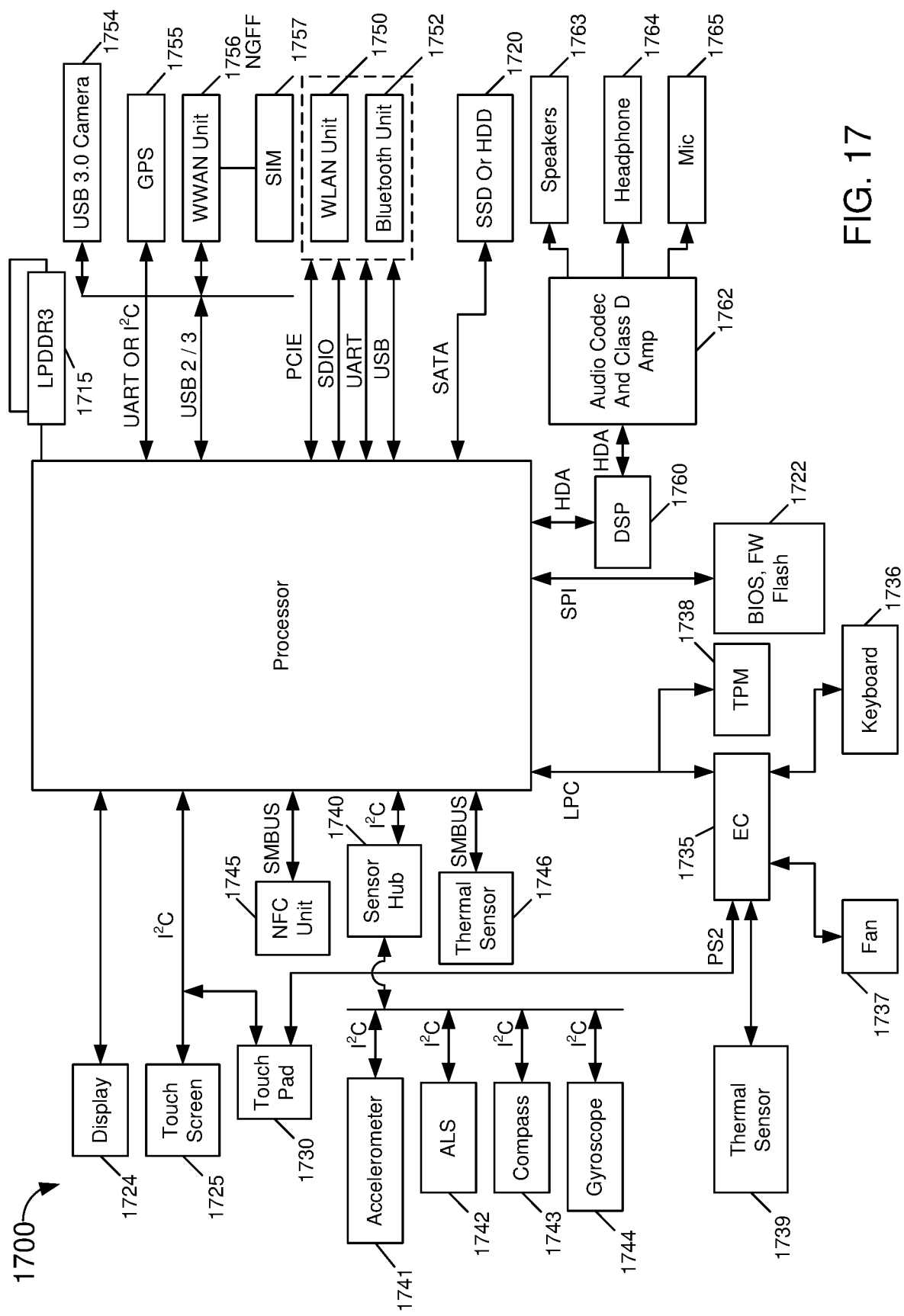
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as I$^2$C bus, system management bus (SM-Bus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1755, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1736, and touch pad 1730 may be communicatively coupled to EC 1735. Speaker 1763, headphones 1764, and a microphone 1765 may be communicatively coupled to an audio unit 1764, which may in turn be communicatively coupled to DSP 1760. Audio unit 1764 may include, for example, an audio codec and a class D amplifier 1762. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

In various embodiments, a processor includes logic or other circuitry to determine when instructions can be folded or removed from an execution portion of a pipeline, by way of so-called immediate folding. More specifically as described herein, embodiments may identify certain incoming instructions, e.g., particular integer-based instructions, and provide for a non-execution unit-based handling of such instructions in a manner to increase performance (e.g., by way of instruction per cycle (IPC) increase) and reduce a dependency chain. Such integer-based instructions may include so-called immediate values, which are numerical values provided with an instruction to be used as an additional source of data for instruction execution. Folding an immediate value of certain operations thus enables execution of such operations with zero clock delay, and without execution in execution logic. As such, embodiments increase performance (including IPC) by reducing the critical dependency chain.

As examples, immediate folding as described herein can remove additional/subsequent operations between an integer register and an immediate value by accumulating (folding) small immediate values at allocation into a wider accumulator folded immediate value (FIMM) and saving the folded immediate value in an immediate buffer. Once folded, this integer register can be represented by its physical register file (PRF) entry (at its PRF entry pointed by the RAT state) and the FIMM value (stored in the immediate buffer) and the operation (e.g., ADD/SUB, shift or other operation). In turn, when the register value can no longer remain folded, the value is unfolded into a destination register of the target register. The unfolding operation can be performed as part of the operation that caused the unfolding.

Although the scope of the present invention is not limited in this regard, immediate folding as described herein may be used in connection with all addition and subtraction operations involving a single source and an immediate (note that one or both of the source and immediate may be explicit or implicit). Embodiments may also be used for POP and PUSH operations, which include an implicit increase or decrease of the ESP register.

In an embodiment, decode logic may detect immediate folding opportunities such as ADD/SUB operations between an integer register and an immediate value. Instead of executing such operations via an arithmetic logic unit of an execution logic during an execution phase of a pipeline, the immediate value is accumulated into a dedicated folded immediate (FIMM) buffer at allocation phase. In this way, immediate folding cuts the long dependency of a repeated operation with a small immediate. For given code, such folding can remove a significant number of operations and allow other operations that reside on the critical path to run faster by better utilizing available ALU resources.

In one embodiment, instructions may be of a selected type to enable folding. Such instructions, in an embodiment, may be of the type ADD, SUB, MOVE with an immediate value. In implementations, the immediate value may be limited to a certain size, e.g., less than a threshold width. Examples of such instructions include the following instruction semantics:

ADD dest, src, imm; //(|imm|<threshold) N-bits IMM
SUB dest, src, imm; //(|imm|<threshold) N-bits IMM
INC dest
DEC dest
MOV dest, imm; //(|imm|<threshold) N-bits IMM
LEA ea.

To implement instruction folding as described herein, a folded immediate (FIMM) buffer may be provided within a processor, and which may be associated with a register rename alias table (RAT). Entries in this buffer may be inserted during an allocation phase when a particular instruction is identified for immediate folding.

Referring now to FIG. 18A, shown is an arrangement of code having loop-based operation. More specifically, as shown in FIG. 18A, a code block 1810 provides a loop of instructions in which an accumulated value is updated per loop iteration (e.g., by way of an increment instruction (INC) to increment the value of an accumulator register (EAX)). Thereafter the value of this accumulator register is used as a memory location of a move from memory instruction, which is stored in a given architectural register after it is read from the memory (e.g., XMM4 and XMM5 in the different loops shown in FIG. 18A). Of course additional instructions, e.g., to perform various calculations, may thereafter be performed within the loops.

As illustrated in FIG. 18A, without immediate folding as described herein, a dependency occurs as illustrated in code block 1820 between iterations such that the instructions of the second loop iteration cannot be performed until the instructions of the first loop iteration occur (such that the proper incremented value of EAX is available for the second move operation). That is, the value of EAX, as incremented at the beginning of each loop iteration, is later used to access a memory location. The addition operations delay the memory access and different iterations have a different amount of time spent waiting for the value.

In contrast, using an embodiment of the present invention with immediate folding enabled, increments (as an example operation) can be executed outside of execution logic of the processor (e.g., within a RAT or similar structure) and may be executed at allocation with zero delay. As such, each loop does not depend on the result of the prior loop operations and as such, multiple loops may be executed in parallel, improving IPC.

Thus as illustrated in FIG. 18B, with immediate folding as described herein, an original code segment 1830 (which corresponds to the same original code segment 1810) can remove dependencies between iterations of the loop. Still further, as illustrated in code section 1840, which represents decoded instructions provided from a decoder or other logic to identify opportunities for immediate folding as described herein, the increment instructions (each of which in an embodiment may be implemented as a micro-operation (uop)) can be removed from being scheduled into execution logic of the processor. Still further, a physical register file (PRF) entry for such operations need not be allocated. Instead, upon allocation into the RAT, an immediate increment operation can be performed and the resulting folded immediate data may be stored into a corresponding entry of a folded immediate buffer, as described further herein.

Figure 19:
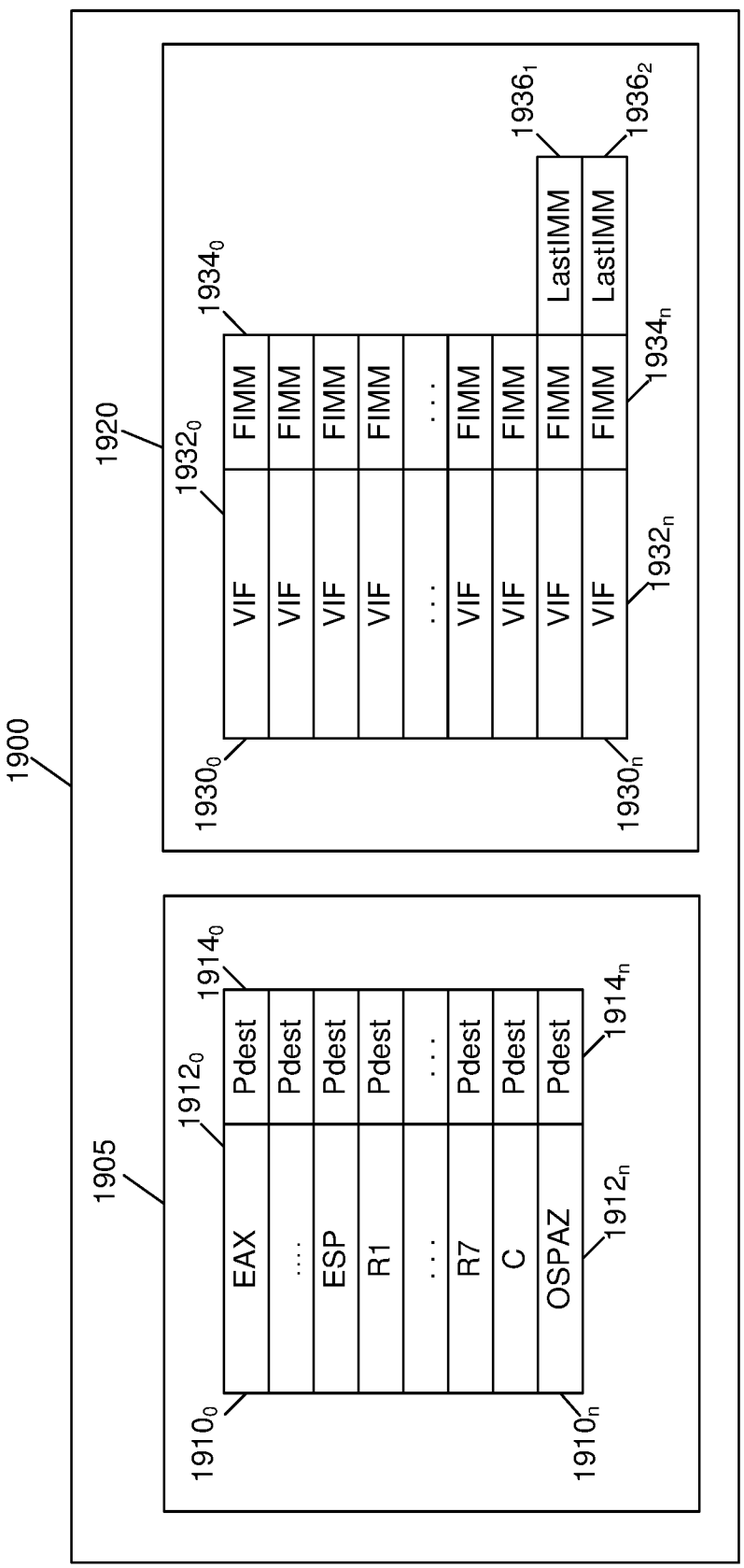
FIG. 19 is a block diagram of a register rename alias table and related structures in accordance with an embodiment.

Referring now to FIG. 19, shown is a block diagram of a register rename alias table and related structures in accordance with an embodiment. As shown in FIG. 19, circuitry 1900 may be part of a processor such as a given multicore processor or other SoC. As seen, circuitry 1900 includes a RAT 1905 and a folded immediate buffer 1920. Although shown as separate structures in the embodiment of FIG. 19, in some implementations buffer 1900 may be implemented as additional fields within RAT 1905. Such additional RAT state may include, per integer register: a valid indicator (VIF) to indicate that a folded immediate is stored for that value; and a folded immediate field (FIMM) which may be a given amount of bits. Note that each flags group represented in the RAT may also be associated with an additional field to be used in the event of flag reconstruction: (Last-IMM) last immediate value, namely an immediate value associated with a folded instruction (that is, the last immediate value added to a folded immediate value).

First with reference to RAT 1905, a plurality of entries $1910_0$-$1910_n$ are provided. As seen, each entry includes multiple fields, including a logical identifier field $1912_0$-$1912_n$ and a corresponding physical identifier field $1914_0$-$1914_n$. In an embodiment, there may be a corresponding entry for each architectural register of a processor. Such registers can include a variety of well-known architectural registers, such as an accumulator register (EAX), a stack pointer register (ESP), general purpose registers (e.g., R1-R7), and flag registers. Specifically as shown in FIG. 19, an entry $1910_{n-1}$ may be associated with a carry flag register (C) and entry $1910_n$ may be associated with an OSPAZ flag register, which provides various flag information, including in one embodiment, an overflow (O) flag, a sign flag (S), a parity flag (P), an auxiliary flag (A) and a zero flag (Z). As further illustrated, each entry 1910 further includes a corresponding physical identifier field $1914_0$-$1914_n$. Each such field may store an identifier or other pointer to a physical register associated with the corresponding architectural register, which may be stored in a PRF of the processor.

Still with reference to FIG. 19, folded immediate buffer 1920 includes corresponding entries $1930_0$-$1930_n$. Each such entry 1930 is associated with a corresponding entry 1910 in RAT 1905. As discussed above, in some implementations folded immediate buffer 1920 can be implemented as additional fields within RAT 1905. In the embodiment shown, each entry 1930 includes various fields to store information. A valid field $1932_0$-$1932_n$ is to store a valid indicator to indicate that a valid folded immediate is stored for the corresponding value. A second field $1934_0$-$1934_n$ is a folded immediate field configured to store a corresponding folded immediate value (FIMM). In one embodiment, a maximum width of second field 1934 may be 13 bits. As further illustrated, a third field $1936_1$ and $1936_2$ is provided for entries $1930_{n-1}$ and $1930_n$ associated with the flag registers, to enable storage of a last immediate value (Last-IMM), which corresponds to a last immediate value, namely the immediate value of a folded instruction last accumulated into the FIMM and generated one of the flags fields.

With the information present in folded immediate value buffer 1920, flag values can be reconstructed even where the corresponding instructions (that generate both data and flag portions) are folded and thus not executed within the execution logic of the processor. Understand while shown at this high level in the embodiment of FIG. 19, many variations and alternatives are possible.

Figure 20:
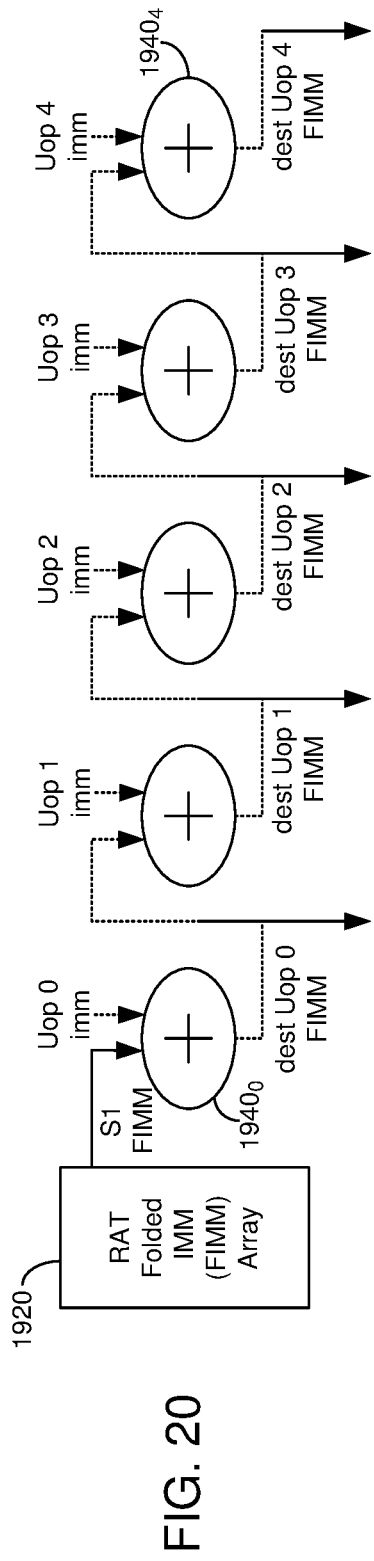
FIG. 20 is a block diagram of additional logic associated with a folded immediate buffer in accordance with an embodiment.

Referring now to FIG. 20, shown is a block diagram of additional logic associated with a folded immediate buffer in accordance with an embodiment. As illustrated in FIG. 20, folded immediate buffer 1920 is provided and may include multiple entries, as discussed above. As further shown in FIG. 20, a plurality of accumulators $1940_0$-$1940_4$ are associated with folded immediate buffer 1920. Note that these accumulators are separate and apart from any execution logic of a processor pipeline. For example, such accumulators may be implemented within the RAT/folded immediate buffer structures themselves such that they are not on the critical path. Such accumulators 1940 may be leveraged to perform immediate value accumulations as entries are allocated into folded immediate buffer 1920. Understand while five accumulators are shown in the specific illustration of FIG. 20, the number of accumulators can vary, e.g., depending that the uop-allocation width of the processor.

In an embodiment, each folded instruction or uop has a FIMM and a current IMM of the uop. If the first uop of an allocation window is folded, then first adder $1940_0$ will produce the FIMM of the destination of that uop. If the second uop of the allocation window is to be folded, then its current IMM value is added to the FIMM of its source. If the destination of the first uop is used as a source of the second uop, then the FIMM of the second uop is the accumulated value of the FIMM of the register and the current IMM of both uops. Thus if, EAX FIMM=6;

uop 0 EAX=INC EAX EAX.FIMM=6+1;
uop 1 EAX=INC EAX EAX.FIMM=6+1+1; and so on.

As illustrated in FIG. 20, accumulators 1940 are coupled to receive as a source an output of a preceding accumulator when all uops have the same destination/source. Otherwise each accumulator 1940 is separated and the FIMM value is read from the array. In general, each uop can read the accumulated data from each of the uops that precedes it or from the array.

At allocation of a folded uop, the FIMM stored in the RAT FIMM array per source operand will be read. Then, the per-uop IMM value associated with the destination is accumulated and stored in the RAT entry of the destination register. As illustrated in FIG. 20, each accumulator 1940 is configured to receive a corresponding source immediate value (which may correspond to an accumulated folded immediate value) from folded immediate buffer 1920 (or an upstream accumulator) and perform an accumulation with an incoming immediate value of a uop to be folded. In turn, each accumulator 1940 is configured to output an accumulated folded immediate value, which may be provided to a downstream accumulator associated with a succeeding uop to be folded (and further to be stored in a corresponding entry of folded immediate buffer 1920 associated with a destination of the folded uop).

For purposes of illustration reference is made to accumulator $1940_0$, which is configured to receive a first source folded immediate value (S1 FIMM) from folded immediate buffer 1920 and accumulate that value with the immediate value (Uop 0 imm) of a first uop to be folded. And in turn, accumulator $1940_0$ outputs an accumulated folded immediate value (dest Uop 0 FIMM) to be associated with a destination of the folded instruction. Note that folded immediate data may either be used as a source by each allocated uop or may be unfolded. That is, folded IMM data may either be used as a source by each allocated uop or be unfolded. Unfolding is performed when folding is no longer possible. This can occur when the size of the FIMM exceeds the maximal value that can be stored in the FIMM buffer, or when the folded value is consumed by an operation that cannot be folded. Example operations that cannot be folded include non-ADD/SUB operation or an ADD/SUB operation of two registers.

Figure 21:
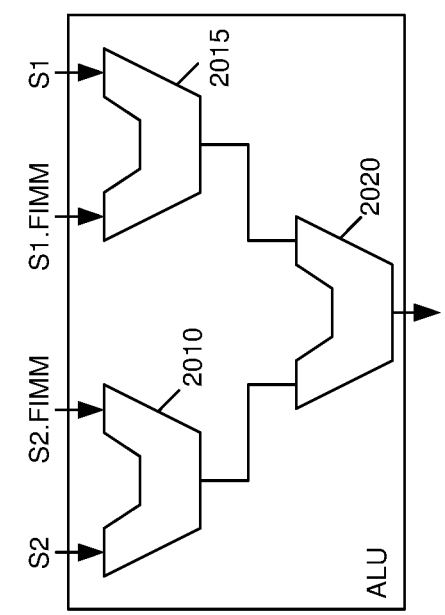
FIG. 21 is a block diagram of an arithmetic logic unit (ALU) in accordance with an embodiment.

As discussed above, when a given instruction cannot be folded, such as where an arithmetic operation is to be performed on two source values, an unfolding operation may be performed. Referring now to FIG. 21, shown is a block diagram of an arithmetic logic unit (ALU) 2000 in accordance with an embodiment. Note that in some cases, ALU 2000 may be a standalone unit, e.g., associated with RAT/folded immediate buffer structures, such that when unfolding is to be performed, it can be performed off the critical path and apart from ALUs or other logic circuits of an execute logic of the processor pipeline.

As illustrated in FIG. 21, to enable unfolding operations for two source values, a first pair of accumulators 2010 and 2015 are provided. Each such accumulator receives a corresponding source value (namely the source values of the non-folded instruction, shown here as source values S1 and S2), and the folded immediate values associated with these two source values (respectively, S1.FIMM and S2.FIMM) and generates a partial sum value. After accumulation in accumulators 2010 and 2015, these partial sum values are provided to another accumulator 2020, which accumulates the values to thus generate the sum of the instruction, which can be provided to a given consumer (and stored, e.g., in a PRF or other interim processor storage). Understand while shown at this high level in FIG. 21, many variations and alternatives are possible. Of course understand that other unfolding schemes can be generated per operation and per the timing constraints of the ALU and other execution logic structures. Embodiments may thus provide a performance increase and an increased number of operations executed within a given timeframe.

Figure 22:
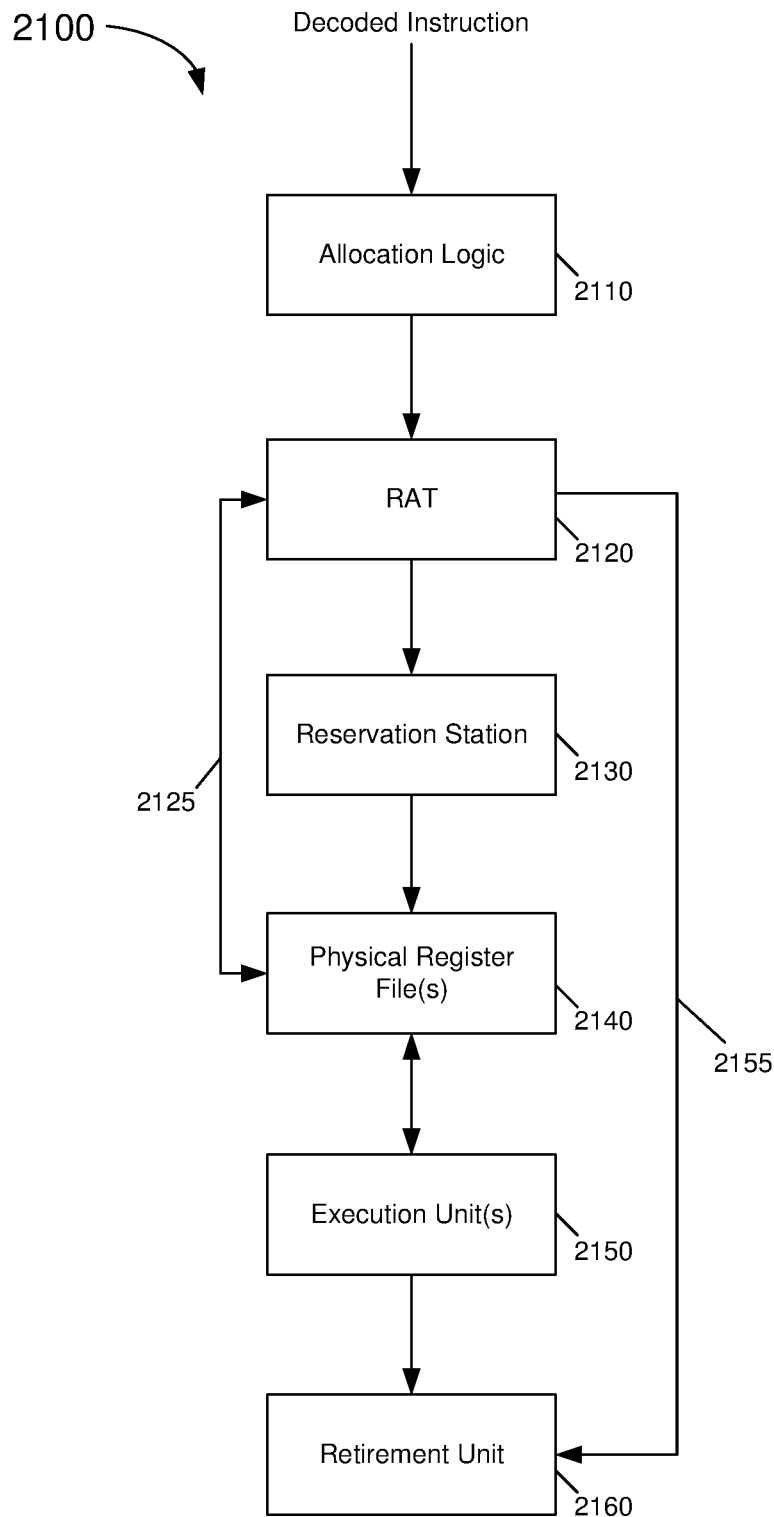
FIG. 22 is a block diagram of a portion of a processor in accordance with an embodiment.

Referring now to FIG. 22, shown is a block diagram of a portion of a processor in accordance with an embodiment of the present invention. As shown in FIG. 22, the portion of processor 2100 shown corresponds to various front end and execution units that in turn couple to one or more back end units. Note that the terms "unit," "logic," and "circuit" are used interchangeably herein to describe hardware circuitry adapted to perform particular tasks. In FIG. 22, a decoded instruction is provided to an allocation logic 2110. In an allocation phase for an instruction, allocation logic 2110 may be configured to allocate an entry for a destination operand in a RAT 2120 (to point to a physical register in a PRF), and rename one or more source operands present within entries of RAT 2120.

Still referring to FIG. 22, reservation station 2130 couples to one or more physical register files 2140. In various embodiments, reservation station 2130 provides the physical register identifiers from RAT 2120 to schedule the given instruction for execution in a given one of one or more execution units 2150. Still with reference to FIG. 22, execution unit 2150 is coupled to a retirement unit 2160, which may be adapted to retire such instructions after execution within execution units 2150.

Still with reference to FIG. 22, note that there may be multiple bypass networks. Specifically as shown in FIG. 22, a first bypass path 2125 may couple between RAT 2120 and PRF 2140. Using this bypass path, certain values such as destination values can be directly provided from the RAT to the PRF in a case of a folded instruction. More specifically, this bypass path represents a FIMM value that is sent to an ALU via reservation station 2130; note also that the IMM value sent may undergo some calculation in flight and may be considered a hidden bypass level. In addition, values from RAT 2120 may further be directly provided to retirement unit 2160 via a second bypass path 2155, e.g., for cases of branches. Understand while shown at this high level in the embodiment of FIG. 22, many variations and alternatives are possible.

Figure 23:
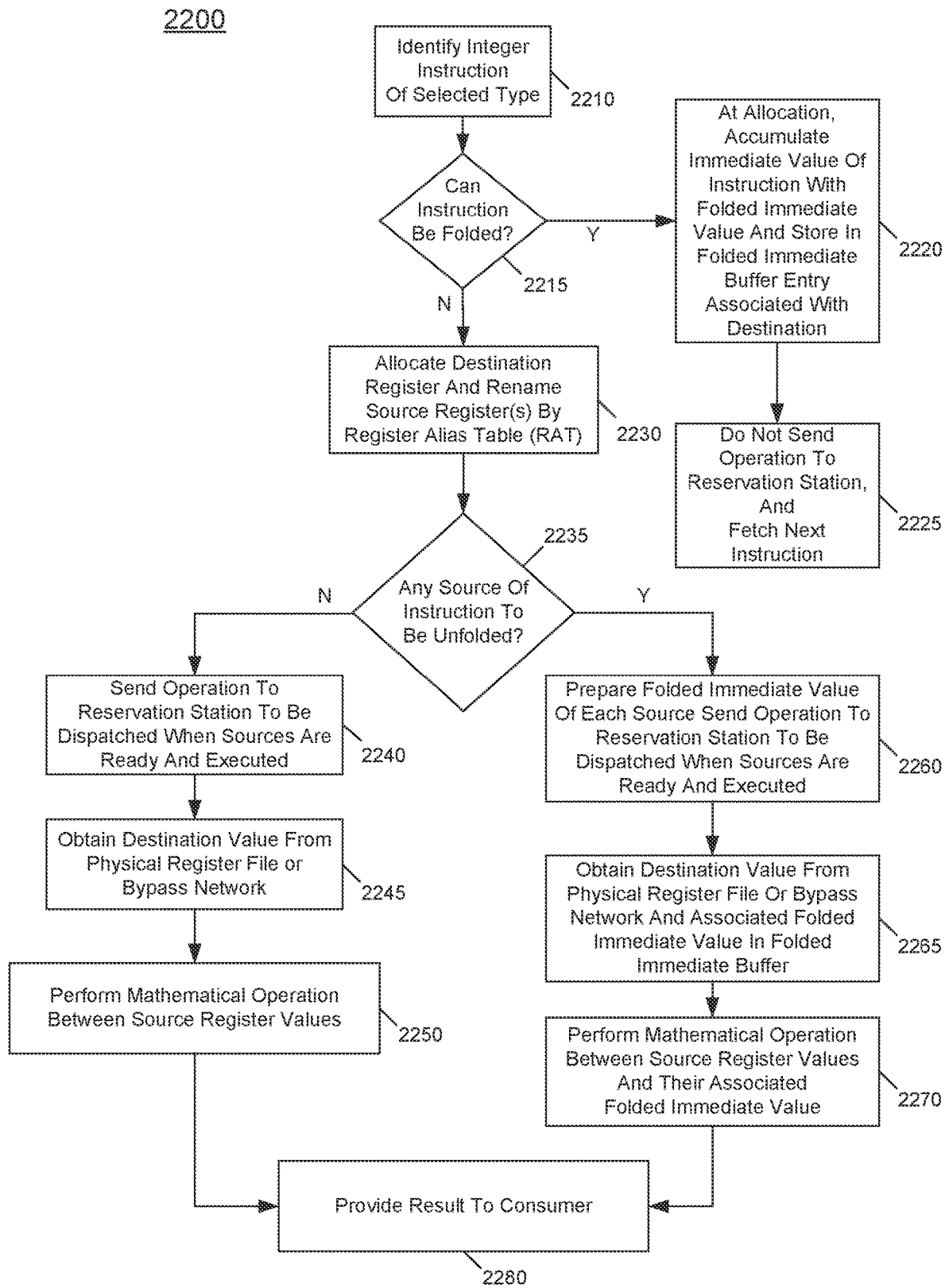
FIG. 23 is a flow diagram of a method in accordance with an embodiment of the present invention.

Referring now to FIG. 23, shown is a flow diagram of a method in accordance with an embodiment of the present invention. More specifically, method 2200 shown in FIG. 23 may be performed by various hardware of a processor, including decode logic, which may be implemented by combinations of hardware circuitry, firmware and/or software, to identify instructions that may possibly be subject to folding and to provide for proper handling of such folded (and non-folded) instructions within a RAT and related structures.

As shown, method 2200 begins by identifying an integer instruction of a selected type (block 2210). As an example, such instruction may be an arithmetic operation such as an instruction to add an immediate value to a single source operand and provide the result to a destination operand. Understand that while described in FIG. 23 as being instruction-based, in many cases, the operations may be performed on a uop basis. At diamond 2215 it is determined whether the instruction can be folded. In an embodiment, such determination may be based on the format of the instruction, including the width of the immediate value as compared to a threshold and/or to an accumulated folded immediate value to determine whether the accumulated folded immediate value would overflow. If it is identified that the instruction can be folded, control passes to block 2220 where, at an allocation phase, the immediate value of the instruction can be accumulated with a folded immediate value. This result is stored in a folded immediate buffer entry associated with a destination of the instruction. Then at block 2225 the instruction is not sent to a reservation station, and instead a next instruction can be fetched for handling. Thus there is no scheduling or execution of this folded instruction within the processor pipeline.

Note that in block 2225, when an instruction is to be folded, there is no need to rename sources or allocate a PRF entry for the destination, as the instruction is not executed. Instead, an original PRF entry may be used while the immediate value is accumulated in the RAT per register accumulator.

In one embodiment, a uop can be folded only if the immediate value can be represented in an accumulator with no overflow. Otherwise, the instruction executes in a conventional manner (and one or more sources may be unfolded (as appropriate)). Still referring to FIG. 23, if instead at diamond 2215 it is determined that the instruction cannot be folded, control passes to block 2230 where in an allocation phase, a destination register may be allocated within a RAT and one or more source registers may be renamed. For the destination register, it is allocated by the RAT such that a physical register is allocated to the PRF. For the source register(s), renaming by the RAT may occur by mapping a logical register into a physical register location in the PRF.

Still referring to FIG. 23, next it is determined whether any source of the instruction is to be unfolded (diamond 2235). Note that this determination at diamond 2235 may occur, as even where a uop is not folded one or more of its sources may need to be unfolded. If not, control passes to block 2240 where the operation can be sent to a reservation station to be dispatched when its sources are ready for execution. At block 2245, a destination value may be obtained from the PRF or a bypass network. Thereafter at block 2250 a given mathematical operation may be performed between the source register values, and the result provided to a given consumer (block 2280). Note that such consumer may directly receive the value, e.g., via a bypass path. In addition, the result may be stored in appropriate destination location in the PRF.

Still with reference to FIG. 23, if instead it is determined that one or more sources are to be unfolded, control passes from diamond 2235 to block 2260. There, a folded immediate value of each source may be prepared. In addition, the operation is sent to the reservation station to be dispatched when the sources are ready, as discussed above. Next at block 2265, a destination value can be obtained from the physical register file or bypass network. In addition, the associated folded immediate value may be obtained from the folded immediate buffer. Thereafter at block 2270, a mathematical operation can be performed between the source register values and their associated folded immediate values, with the result provided to the consumer at block 2280 as discussed above. Understand while shown at this high level in the embodiment of FIG. 23, many variations and alternatives are possible.

The x86 ISA defines operations that produce all flags (e.g., an ADD operation sets all flags, including the C flag and all OSPAZ flags); operations that generate partial sets of flags (for example INC sets only OSPAZ flags) and operations that do not generate flags (like a MOVE or LEA). The x86 ISA also defines instructions that consume different sets of flags (for example, an add with carry (ADC) instruction consumes the C flag only, while jump condition code (JCC) or conditional move (CMOV) instructions can use a variety of flags combinations).

In many use scenarios, the flags generated by most flags generation operations are rarely used. This occurs since most flags consumers such as JCC operations are macro-fused with the flags generation operation (like ADD and JCC), and the flags they generate are either not consumed by any other instruction other than the JCC or are overridden by the next flag generation operation. Embodiments provide a representation scheme for a flag group such that an underlying flag operation can be removed when not needed and later restored on demand. For each folded instruction that implicates flag generation, a decision may be made if a flags only generation operation is to be issued. Embodiments also enable restoration of a flag value to allow state restoration in case of a fault.

To reconstruct a flag entry in the RAT (that included a PRF entry pointing to a PRF value of the flags), the underlying folded instruction is replaced with a set of values and an operation. Such values include the accumulated IMM value and the last IMM value added to the accumulated IMM value.

To regenerate the flags, the following operations may be performed, in one embodiment:

New accumulated IMM:=accumulated IMM value−Last IMM value [Eq. 1]; (where Accumulated IMM value is stored in the FIMM (and Last IMM value is the immediate of folded instruction from which flags are to be reconstructed));

New Register:=Register+New accumulated IMM [Eq. 2]; (where Register is a pointer to PRF entry of source of folded instruction); and Flags:=(New Register+Last IMM value).flags−flags of the additions [Eq. 3].

The first two operations recover the register to its value before the operation that was removed while the third operation reconstructs the flags value (of the silent folded instruction that was the last flag generation operation of these flags).

A flags generation uop may be matched with a future consumer of the flags. During an allocation window, whenever the flags generated by a first operation are overridden by a second flags generation operation, then the flags generation performed by the first operation can be ignored. If both the data and flags portions of an operation can be removed (due to an idiom or by IMM folding), then the complete operation can be removed. Otherwise if the data portion of an operation can be removed but the flags are to be used by a future consumer, the operation may be issued to generate the flags only, for the benefit of the flags consumer operation.

In various embodiments, the flags removal process can be maintained within a single allocation window or checked across several allocation windows. In either case, the last flags generation uop of a tested set may be controlled to be performed to ensure that when the allocation continues, the resulting flags are provided to any future consumer at no cost. Removing a data portion of an operation removes a data dependency of its operation on a destination data register, allowing IPC increase. The flags portion can be executed with small or no decrease of performance.

Referring now to Table 1, shown is an example set of instructions and flag generation control for the instructions in accordance with an embodiment.

TABLE 1

| INC | data operation removed to cut data dependency chain; flags generated |
|---|---|
| JO | flag consumer (requires OSPAZ-flag) |
| INC | data and flags of operation can be removed |
| INC | data operation removed to cut data dependency chain; flags generated |
| STORE | no flag generation |

In the example of Table 1, the branch instruction (jump if overflow (JO)) requires the flags and therefore the first INC instruction is to generate the flags, but its data result is not needed (it can be folded). The second INC instruction can be completely removed, while the third INC instruction may have flags generated for potential flags consumer of a next allocation window.

Referring now to Table 2, shown is another example set of instructions and flag generation in accordance with an embodiment.

TABLE 2

| ADD | data and flags of operation can be removed |
|---|---|
| INC | data and flags of operation can be removed |
| ADD | data and flags of operation can be removed |
| INC | data and flags of operation can be removed |
| ADD_JO | generate ALL flags |
| LEA | no flag generation |

In the example of Table 2, all folded uops do not need to generate the flags since the macro branch (Add_JO) will generate all flags, and it is the last flags generation uop in the allocation windows (note that according to x86 semantics, LEA does not generate any flags), ensuring that a future flags consumer can receive its flag values.

In one embodiment, a flag equation may be maintained by RAT structures such that if the next operation faults, the architectural state that includes registers value and flags can be reconstructed and placed in the PRF before the fault handling starts. In various embodiments, reconstruction logic may be provided to reconstruct the flags using a dedicated set of operations tailored for that mission. In one such case, the reconstruction logic may be implemented as microcode.

During non-microcode flows, the flags are available to flag consumer uops. Reconstruction logic may be configured to ensure that it can reconstruct the flags on exception handling. If a fault occurs within a window on a uop that did not perform flags generation, correct flags values are folded and cannot be consumed as is (by, for example, an ADC uop). Embodiments may trigger the reconstruction logic, e.g., via a reconstruction request, to reconstruct the flags during the preparation of exception handling. By reducing the number of flags generation uops issued to a processor pipeline, IPC may be increased and power consumption reduced.

Figure 24:
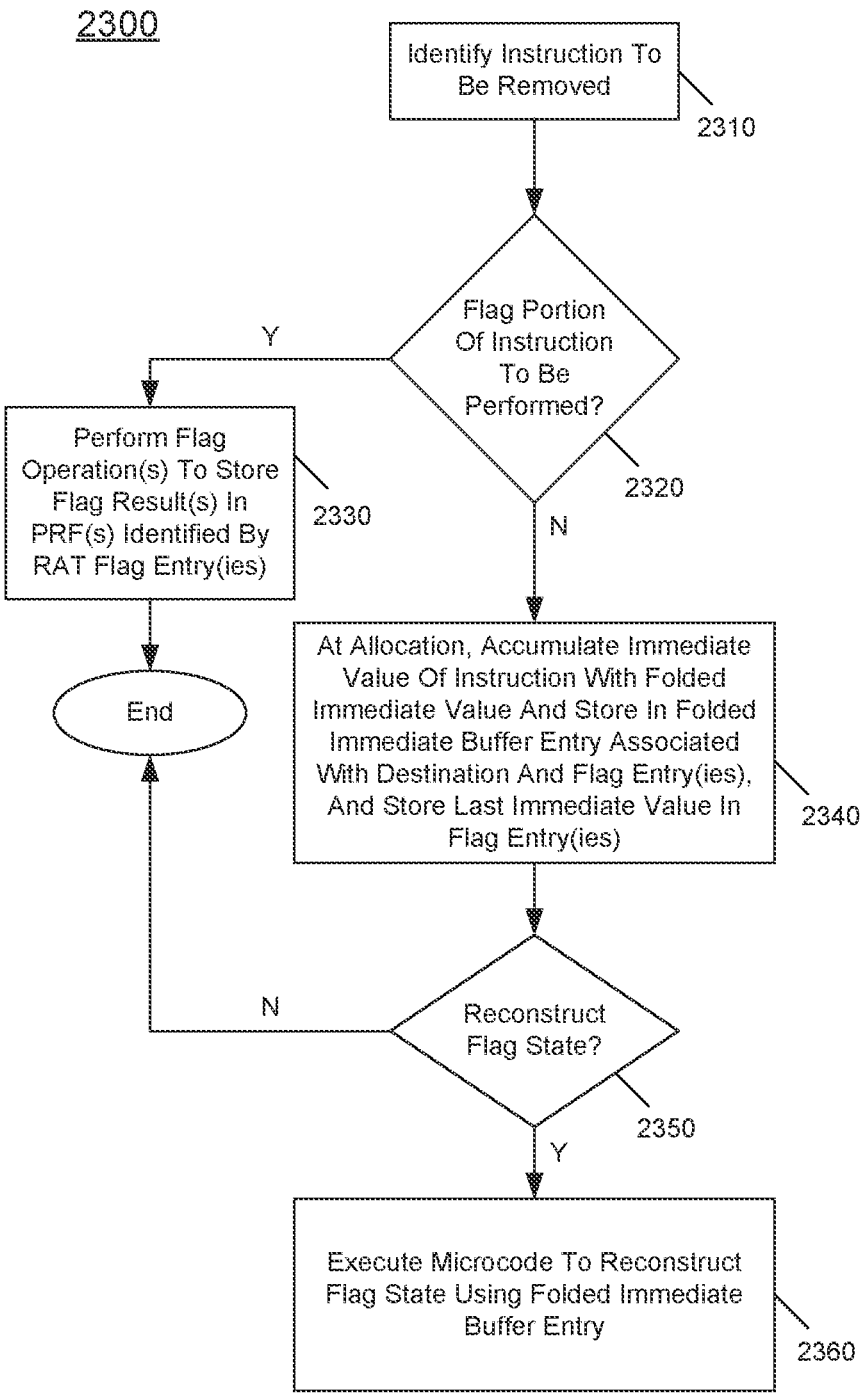
FIG. 24 is a flow diagram of a method for performing flag operations in accordance with an embodiment.

Referring now to FIG. 24, shown is a flow diagram of a method for performing flag operations in accordance with an embodiment. As seen, method 2300 begins by identifying an instruction to be removed (block 2310). Such instruction may be, for example, an integer-based arithmetic operation between a single source operand and an immediate value such that the instruction can be folded or removed. Understand of course other types of instructions also can be removed.

Next at diamond 2320 it is determined whether a flag portion of the instruction is to be performed. That is, for at least certain instructions, operations include both data portion operations to be performed on source information of the instruction, and flag portion operations, which generate a flag result based on, e.g., a result of the underlying data portion.

Various criteria can be considered and analyzed in determining whether a flag portion of an instruction is to be performed. Suffice to say, if it is likely that the flag result is to be consumed by another instruction, the flag portion is to be performed. Control passes in that instance to block 2330 where one or more flag operations may be performed to obtain a flag result. This flag result (or results as certain instructions may generate flag results for multiple flags registers) may be stored in a location in a PRF. More specifically, this location in the PRF is identified by a corresponding flag entry in the RAT that points to a physical destination within the PRF. Thus at this point the flag result is stored in the corresponding location in the PRF and the flag operation for this instruction is completed. Note that if the operation is executed, the flags are stored in a 6-bit extension of the 64-bit data. The data and flags are both stored in the same PRF entry. The flag generation is sometimes done in parallel to the ALU operation, like zero flag generation of an ADD operation, or after the operation, like the zero flag generation of an AND operation.

Still with reference to FIG. 24 instead if it is determined that the flag portion of the instruction is not to be performed, control passes to block 2340. Here, at allocation the immediate value of the folded instruction may be accumulated with a folded immediate value. This resulting sum can be stored in a folded immediate buffer entry associated with both the destination of the folded instruction and flag entries. In addition, the last immediate value itself can be stored in a last immediate field of the flag entries. Also, a last immediate value (which in an embodiment may be the immediate value of the folded instruction itself) is stored in a last immediate value field of the one or more flag entries of the folded immediate buffer.

Still with reference to FIG. 24, next it is determined whether the flag state of this folded flag portion of an instruction is to be reconstructed (as determined at diamond 2350). Such reconstruction may be determined to occur based upon receipt of a reconstruction signal, which is generated, e.g., due to a fault or other error indication in which flag state is to be recovered. If such reconstruction is to occur, control passes to block 2360 where a microcode handler may be executed. More specifically, microcode may be executed to reconstruct the flag state using information present in the folded immediate buffer, details of which are described further below. Understand while shown at this high level in the embodiment of FIG. 24, many variations and alternatives are possible. For example, understand that folding of flag operations also may be performed for instructions in which data portions are performed.

Figure 25:
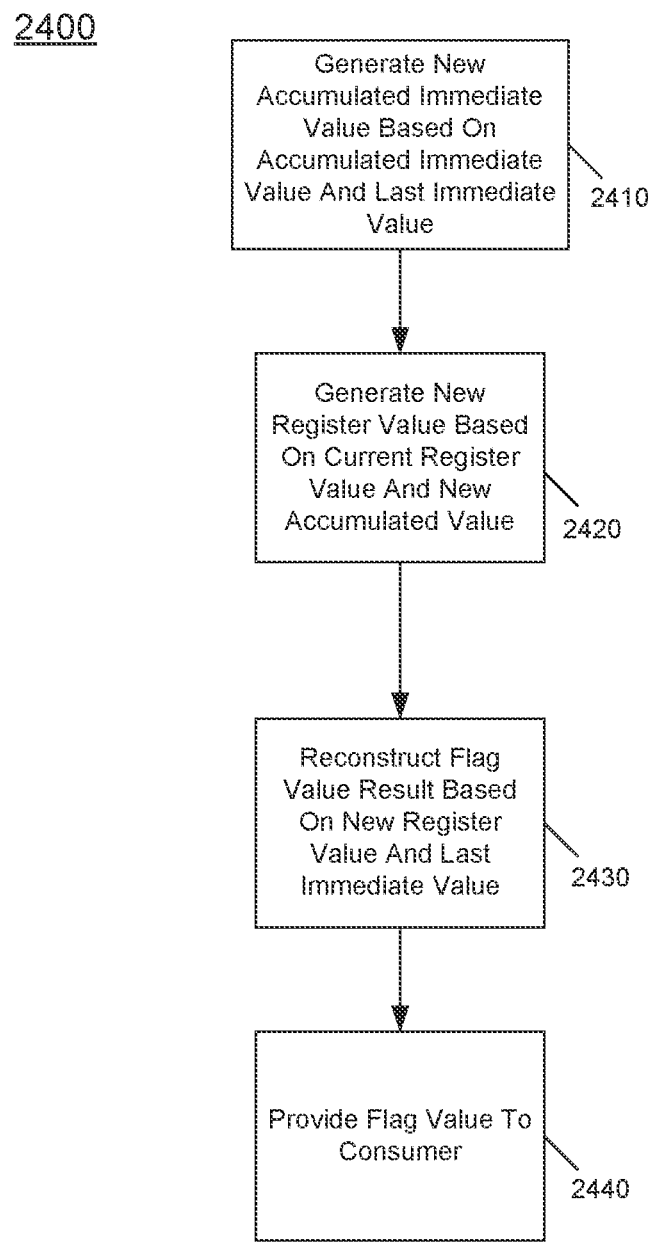
FIG. 25 is a flow diagram of a method for reconstructing flag information in accordance with an embodiment.

Referring now to FIG. 25, shown is a flow diagram of a method for reconstructing flag information in accordance with an embodiment. In various embodiments, method 2400 may be performed by hardware logic within a processor, such as given logic circuitry and/or combinations of hardware, software, and/or firmware. In a particular embodiment, method 2400 may be performed by a microcode handler to execute the reconstruction. As seen, method 2400 begins at block 2410 by generating a new accumulated value based on an accumulated immediate value and a last immediate value. Note that the accumulated immediate value is a folded immediate accumulator value post last operation (prior to the operation for which flags are to be reconstructed). And the last immediate value may be the last immediate value added to the folded immediate accumulator value (namely the immediate value of the operation that was folded). As such, block 2410 is configured to determine a folded immediate value pre-last operation.

Next at block 2420 a new register value may be generated based on a current register value and this new accumulated immediate value. Note that this current register value is the value stored in a PRF pointed to by an entry within the RAT. As such, block 2420 is configured to determine a new register value corresponding to a source of the folded instruction. In some cases, the operations can be done in parallel, and thus the new register value is not actually stored. Thereafter at block 2430 one or more flag values can be reconstructed based on this new register value and the last immediate value, which generates a result of the folded instruction (data portion) if that instruction would have been performed. In some cases, flag reconstruction can be done in parallel, for all flags or for each flags field separately. Thus a flag result may be reconstructed based on the value of the new register, which is derived as above. Finally, at block 2440 the flag value (values) may be provided to a given consumer. As an example, this flag value may be provided for storage in the flag registers (as identified by a pointer within the flag entries of the RAT). Still further in some cases one or more of the flag results may be provided directly, e.g., to an exception handler for use in resolving a fault or other error. Understand while shown at this high level in the embodiment of FIG. 25, many variations and alternatives are possible.

In one example, a processor comprises fetch logic to fetch instructions, decode logic to decode the fetched instructions, and an execution logic to execute at least some of the instructions. The decode logic may determine whether a flag portion of a first instruction to be folded is to be performed, and if not, accumulate a first immediate value of the first instruction with a folded immediate value obtained from an entry of an immediate buffer.

In an example, the processor further comprises reconstruction logic to perform the flag portion of the first instruction to reconstruct a flag result of the first instruction, when the decode logic determines that the flag portion of the first instruction is not to be performed.

In an example, the reconstruction logic is to perform the flag portion responsive to a reconstruction request, the reconstruction request responsive to a fault.

In an example, the reconstruction logic comprises microcode.

In an example, the reconstruction logic is to: calculate a first value based on an operation between the first immediate value and the accumulation of the first immediate value and the folded immediate value; and calculate a second value based on an operation between the first value and a source value of the first instruction.

In an example, the reconstruction logic is to calculate the flag result based at least in part on an operation between the second value and the first immediate value.

In an example, the decode logic is to determine that the flag portion is to be performed when a succeeding instruction is to consume at least a portion of a flag result of the first instruction.

In an example, the decode logic is to determine that the flag portion is to be performed when the first instruction is a last instruction of a set of instructions.

In an example, the decode logic is to determine that the flag portion is not to be performed when a second instruction following the first instruction is to override a flag result of the first instruction.

In an example, the decode logic is to determine that a flag portion of a second instruction is to be performed, but that a data portion of the second instruction is not to be performed.

In an example, the immediate buffer comprises a plurality of entries each associated with an operand of an instruction having a corresponding entry in a RAT and including a first field to store a folded immediate value and a second field to store a valid indicator to indicate whether the folded immediate value stored in the first field is valid, where an accumulation logic is to accumulate the folded immediate value stored in a first entry of the immediate buffer with one or more immediate values of one or more instructions.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: determining, in a first logic of a processor, whether a first instruction having a first immediate value can be folded; responsive to determining that the first instruction can be folded, accumulating the first immediate value with a folded immediate value stored in a first entry of an immediate buffer of the processor, to obtain an accumulated first immediate value; determining whether a flag portion of the first instruction can be folded; responsive to determining that the flag portion can be folded, storing the first immediate value in a field of at least one flag entry of the immediate buffer; and withholding the first instruction from an execution logic of the processor.

In an example, the method further comprises determining that the flag portion cannot be folded when a succeeding instruction is to consume at least a portion of a flag result of the first instruction.

In an example, the method further comprises determining that the flag portion cannot be folded when the first instruction is a last instruction of a set of instructions.

In an example, the method further comprises reconstructing a flag result of the first instruction responsive to a reconstruction request, the reconstruction request responsive to a fault.

In an example, reconstructing the flag result comprises: calculating a first value based on an operation between the first immediate value and the accumulation of the first immediate value and the folded immediate value; calculating a second value based on an operation between the first value and a source value of the first instruction; and determining the flag result based at least in part on an operation between the second value and the first immediate value.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a processor having an execution logic and first logic coupled to the execution logic. The first logic may prevent a data portion and a flag portion of a first instruction from execution in the execution logic. The first instruction prescribes an arithmetic operation between a single source operand and a first immediate value. The first logic may accumulate the first immediate value with a folded immediate value associated with the single source operand of the first instruction and store the first immediate value in at least one entry of an immediate buffer associated with a flag register. The system may further include a dynamic random access memory coupled to the processor.

In an example, the processor further comprises reconstruction logic to perform the flag portion of the first instruction to reconstruct a flag result of the first instruction, responsive to a reconstruction request.

In an example, the reconstruction logic is to: calculate a first value based on an operation between the first immediate value and an accumulation of the first immediate value and a folded immediate value; and calculate a second value based on an operation between the first value and a source value of the first instruction.

In an example, the reconstruction logic is to generate the flag result based on the second value and the first immediate value.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   fetch logic to fetch instructions,
   decode logic to decode the fetched instructions, and
   execution logic to execute a subset of the instructions,
   wherein the decode logic is to:
      identify a first instruction to be withheld from the execution logic, the first instruction including a first immediate value;
      store the first immediate value of the identified first instruction in a first field of a first entry included in a folded immediate data structure; and
      accumulate the first immediate value of the identified first instruction with a folded immediate value stored in a second field of the first entry included in the folded immediate data structure.

2. The processor of claim 1, wherein the decode logic is to:
   withhold the identified first instruction from the execution logic of the processor.

3. The processor of claim 1, wherein the folded immediate data structure comprises a plurality of entries, and wherein each entry of the plurality of entries is associated with a corresponding entry in a register rename alias table.

4. The processor of claim 1, wherein the first entry in the folded immediate data structure includes a third field to store a valid indicator to indicate whether the folded immediate value stored in the second field of the first entry is valid.

5. The processor of claim 1, wherein the folded immediate value stored in the second field of the first entry accumulates a plurality of immediate values of a plurality of instructions.

6. The processor of claim 1, comprising reconstruction logic to:
   calculate a new accumulated immediate value based on an operation between the folded immediate value stored in the second field of the first entry and the first immediate value stored in the first field of the first entry; and
   calculate a new register value based on an operation between the new accumulated immediate value and a source value of the first instruction.

7. The processor of claim 6, wherein the reconstruction logic is to generate a flag result based on the calculated new register value and the first immediate value stored in the first field of the first entry.

8. A non-transitory machine-readable medium having stored thereon data, which if used by at least one machine, causes the at least one machine to fabricate at least one integrated circuit to perform a method comprising:
   identifying, in first logic of a processor, a first instruction to be withheld from execution logic of the processor, the first instruction including a first immediate value;
   storing, by the first logic, the first immediate value of the identified first instruction in a first field of a first entry included in a folded immediate data structure; and
   accumulating, by the first logic, the first immediate value of the identified first instruction with a folded immediate value stored in a second field of the first entry included in the folded immediate data structure.

9. The non-transitory machine-readable medium of claim 8, the method further comprising:
   withholding the identified first instruction from the execution logic of the processor.

10. The non-transitory machine-readable medium of claim 8, wherein the folded immediate data structure comprises a plurality of entries, and wherein each entry of the plurality of entries is associated with a corresponding entry in a register rename alias table.

11. The non-transitory machine-readable medium of claim 8, wherein the first entry in the folded immediate data structure includes a third field to store a valid indicator to indicate whether the folded immediate value stored in the second field of the first entry is valid.

12. The non-transitory machine-readable medium of claim 8, wherein the folded immediate value stored in the second field of the first entry accumulates a plurality of immediate values of a plurality of instructions.

13. The non-transitory machine-readable medium of claim 8, the method further comprising:
    calculating a new accumulated immediate value based on an operation between the folded immediate value stored in the second field of the first entry and the first immediate value stored in the first field of the first entry; and
    calculating a new register value based on an operation between the new accumulated immediate value and a source value of the first instruction.

14. The non-transitory machine-readable medium of claim 13, the method further comprising:
    generating a flag result based on the calculated new register value and the first immediate value stored in the first field of the first entry.

15. A system comprising:
    a processor including fetch logic to fetch instructions, decode logic to decode the fetched instructions, and execution logic to execute a subset of the instructions, wherein the decode logic is to:
        identify a first instruction to be withheld from the execution logic, the first instruction including a first immediate value;
        store the first immediate value of the identified first instruction in a first field of a first entry included in a folded immediate data structure; and
        accumulate the first immediate value of the identified first instruction with a folded immediate value stored in a second field of the first entry included in the folded immediate data structure; and
    a dynamic random access memory coupled to the processor.

16. The system of claim 15, wherein the decode logic is to:
    withhold the identified first instruction from the execution logic of the processor.

17. The system of claim 15, wherein the folded immediate data structure comprises a plurality of entries, and wherein each entry of the plurality of entries is associated with a corresponding entry in a register rename alias table.

18. The system of claim 15, wherein the first entry in the folded immediate data structure includes a third field to store a valid indicator to indicate whether the folded immediate value stored in the second field of the first entry is valid.

19. The system of claim 15, wherein the folded immediate value stored in the second field of the first entry accumulates a plurality of immediate values of a plurality of instructions.

20. The system of claim 15, the processor comprising reconstruction logic to:
    calculate a new accumulated immediate value based on an operation between the folded immediate value stored in the second field of the first entry and the first immediate value stored in the first field of the first entry;
    calculate a new register value based on an operation between the new accumulated immediate value and a source value of the first instruction; and
    generate a flag result based on the calculated new register value and the first immediate value stored in the first field of the first entry.

* * * * *